(12) United States Patent
Suzuki

(10) Patent No.: US 9,356,278 B2
(45) Date of Patent: May 31, 2016

(54) BATTERY PACK

(75) Inventor: Toru Suzuki, Kanagawa (JP)

(73) Assignee: NEC Energy Devices, Ltd., Kanagawa (JP)

(*) Notice: Subject to any disclaimer, the term of this patent is extended or adjusted under 35 U.S.C. 154(b) by 181 days.

(21) Appl. No.: 14/007,240

(22) PCT Filed: Sep. 7, 2011

(86) PCT No.: PCT/JP2011/005031
§ 371 (c)(1),
(2), (4) Date: Sep. 24, 2013

(87) PCT Pub. No.: WO2012/131801
PCT Pub. Date: Oct. 4, 2012

(65) Prior Publication Data
US 2014/0023909 A1  Jan. 23, 2014

(30) Foreign Application Priority Data

Mar. 31, 2011 (JP) ................. 2011-078335
Mar. 31, 2011 (JP) ................. 2011-078336
Mar. 31, 2011 (JP) ................. 2011-078337
Mar. 31, 2011 (JP) ................. 2011-078338
Mar. 31, 2011 (JP) ................. 2011-078339
Mar. 31, 2011 (JP) ................. 2011-078340
Mar. 31, 2011 (JP) ................. 2011-078344

(51) Int. Cl.
*H01M 2/00* (2006.01)
*H01M 2/20* (2006.01)
*H01M 2/10* (2006.01)
(Continued)

(52) U.S. Cl.
CPC ............ *H01M 2/206* (2013.01); *H01M 2/1077* (2013.01); *H01M 2/021* (2013.01); *H01M 2/0212* (2013.01); *H01M 10/425* (2013.01)

(58) Field of Classification Search
CPC . H01M 10/425; H01M 2/021; H01M 2/0212; H01M 2/1077; H01M 2/206
See application file for complete search history.

(56) References Cited

U.S. PATENT DOCUMENTS

2003/0082445 A1  5/2003  Smith et al.
2003/0129483 A1  7/2003  Gross
(Continued)

FOREIGN PATENT DOCUMENTS

CN  101517784 A  7/2007
CN  101043092 A  9/2007
(Continued)

OTHER PUBLICATIONS

Office Action mailed Jan. 28, 2015 in related Japanese Application No. 2011-078336 with partial English-language translation (4 pgs.).
(Continued)

Primary Examiner — Patrick Ryan
Assistant Examiner — Ben Lewis
(74) Attorney, Agent, or Firm — Foley & Lardner LLP

(57) ABSTRACT

In order to provide a battery pack that can be produced highly efficiently and contribute to an improvement in productivity, a battery pack of the present invention includes: a plurality of unit batteries 100 that include a positive-electrode pulled-out tab 120 and a negative-electrode pulled-out tab 130; and a board 300 on which pulled-out tab connection sections are formed to connect the pulled-out tabs of different polarities of adjacent unit batteries 100.

13 Claims, 26 Drawing Sheets

(51) Int. Cl.
*H01M 2/02* (2006.01)
*H01M 10/42* (2006.01)

(56) References Cited

U.S. PATENT DOCUMENTS

| | | | |
|---|---|---|---|
| 2003/0146734 A1 | 8/2003 | Kozu et al. | |
| 2005/0140338 A1* | 6/2005 | Kim | H01M 2/202 320/150 |
| 2005/0282069 A1 | 12/2005 | Kim et al. | |
| 2007/0081356 A1 | 4/2007 | Lee et al. | |
| 2007/0231682 A1 | 10/2007 | Aoyama et al. | |
| 2008/0124617 A1 | 5/2008 | Bjork | |
| 2009/0311581 A1 | 12/2009 | Park et al. | |
| 2009/0323293 A1 | 12/2009 | Koetting et al. | |
| 2010/0136420 A1 | 6/2010 | Shin et al. | |
| 2011/0135970 A1* | 6/2011 | Han | H01M 2/204 429/7 |
| 2012/0156527 A1* | 6/2012 | Kataoka | H01M 2/204 429/7 |

FOREIGN PATENT DOCUMENTS

| | | | |
|---|---|---|---|
| CN | 101305397 A | 11/2008 | |
| DE | 10 2009 005 124 A1 | 7/2010 | |
| EP | 1 271 672 A1 | 1/2003 | |
| EP | 1 845 570 A1 | 10/2007 | |
| EP | 2 131 413 | 12/2009 | |
| EP | 2 299 521 A2 | 3/2011 | |
| JP | 2001-035538 A | 2/2001 | |
| JP | 2001-202931 A | 7/2001 | |
| JP | 2002-144047 A | 5/2002 | |
| JP | 2002-165385 A | 6/2002 | |
| JP | 2002-260600 A | 9/2002 | |
| JP | 2003-007262 A | 1/2003 | |
| JP | 2004-179141 A | 6/2004 | |
| JP | 2005-011855 A | 1/2005 | |
| JP | 2005-222701 A | 8/2005 | |
| JP | 2005-347156 A | 12/2005 | |
| JP | 2006-164579 A | 6/2006 | |
| JP | 2006-164895 A | 6/2006 | |
| JP | 2006-244755 A | 9/2006 | |
| JP | 2007-087875 A | 4/2007 | |
| JP | 2007-265945 A | 10/2007 | |
| JP | 2008-091206 A | 4/2008 | |
| JP | 2008-153204 A | 7/2008 | |
| JP | 2008-305774 A | 12/2008 | |
| JP | 2009-163932 A | 7/2009 | |
| JP | 2009-176690 A | 8/2009 | |
| JP | 2009-259581 A | 11/2009 | |
| JP | 2009-272048 A | 11/2009 | |
| JP | 2010-503971 A | 2/2010 | |
| JP | 2010-092598 A | 4/2010 | |
| JP | 2010-170799 A | 8/2010 | |
| JP | 2010-170799 A | 8/2010 | |
| JP | 2010-287568 | 12/2010 | |
| JP | WO 2011/027817 A1 * | 3/2011 | H01M 2/10 |
| JP | 2011-181369 A | 9/2011 | |
| KR | 10-2004-0022713 A | 3/2004 | |
| WO | WO 2006/067903 A1 | 6/2006 | |
| WO | WO 2008/035873 A1 | 3/2008 | |
| WO | WO-2008/102571 A1 | 8/2008 | |
| WO | WO-2010/131780 A1 | 11/2010 | |
| WO | WO 2011/027817 A1 | 3/2011 | |

OTHER PUBLICATIONS

Office Action mailed Feb. 28, 2015 in related Chinese Application No. 201180069786.7 with English-language translation (16 pgs.).
Office Action mailed Feb. 25, 2015 in related Chinese Application No. 201180069789.0 with English-language translation (18 pgs.).
Office Action mailed Jan. 27, 2015 in related Chinese Application No. 201110297042.2 with partial English-language translation (5 pgs.).
Extended European Search Report mailed Jan. 5, 2015 in related European Application No. 11862435.2 (5 pgs.).
Notice of Rejection issued in Japanese Application No. 2011-078335 dated Nov. 5, 2014, with English translation.
Notice of Rejection issued in Japanese Application No. 2011-078336 dated Nov. 5, 2014, with English translation.
Notice of Rejection issued in Japanese Application No. 2011-078337 dated Nov. 12, 2014, with English translation.
Notice of Rejection issued in Japanese Application No. 2011-078338 dated Nov. 12, 2014, with English translation.
Notice of Rejection issued in Japanese Application No. 2011-078339 dated Nov. 7, 2014, with English translation.
Notice of Rejection issued in Japanese Application No. 2011-078340 dated Nov. 12, 2014, with English translation.
Notice of Rejection issued in Japanese Application No. 2011-078344 dated Nov. 12, 2014, with English translation.
Office Action mailed Apr. 1, 2015 in related Chinese application No. 201180069788.6 with English-language translation (11 pgs.).
Extended European Search Report issued in European Application No. 11 862 421.2 dated Sep. 4, 2014.
Extended European Search Report issued in European Application No. 11 862 493.1 dated Aug. 20, 2014.
Second Office Action and Search Report issued in Chinese Application No. 201110297042.2 dated Aug. 12, 2014, with English translation.
Non-final Office Action mailed Jul. 8, 2015 in related U.S. Appl. No. 14/007,591 (9 pgs.).
Non-final Office Action mailed Jul. 16, 2015 in related U.S. Appl. No. 14/007,606 (9 pgs.).
International Seach Report in PCT/JP2011/005031 dated Nov. 29, 2011.
International Search Report in PCT/JP2011/005032 dated Dec. 6, 2011.
International Search Report in PCT/JP2011/005033 dated Nov. 8, 2011.
International Search Report in PCT/JP2011/005034 dated Dec. 20, 2011.
Extended European Search Report issued in European Application No. 11 862 253.9 dated Oct. 31, 2014.
Notice of Rejection issued in corresponding Japanese Application No. 2011-078342 dated Nov. 19, 2014, with English translation.
Final Office Action mailed Jan. 20, 2016 in co-pending U.S. Appl. No. 14/008,417 (9 pgs.).
Final Office Action mailed Jan. 29, 2016 in co-pending U.S. Appl. No. 14/007,606 (10 pgs.).
Non-final Office Action mailed Apr. 8, 2016 in related U.S. Appl. No. 14/007,591 (13 pgs.).

* cited by examiner

Cross-sectional view (C) | View from first surface (A) | Side view (D)

View from second surface (B)

(A)

(B)

(A)          (B)

(A)          (B)

(A)  (B)

BATTERY PACK

This application is the National Phase of PCT/JP2011/005031, filed Sep. 7, 2011, which claims priority to Japanese Application Nos. JP 2011-078335, filed Mar. 31, 2011, JP 2011-078336, filed Mar. 31, 2011, JP 2011-078337, filed Mar. 31, 2011, JP 2011-078338, filed Mar. 31, 2011, JP 2011-078339, filed Mar. 31, 2011, JP 2011-078340, filed Mar. 31, 2011, and JP 2011-078344, filed Mar. 31, 2011, the disclosures of which are hereby incorporated by reference in their entirety.

BACKGROUND OF THE INVENTION

1. Technical Field

The present invention relates to a battery pack that is formed by connecting a plurality of secondary unit batteries, such as lithium ion batteries.

2. Background Art

A lithium ion secondary battery, in which charge and discharge take place as lithium ions move between a negative electrode and a positive electrode, has the following battery characteristics: high energy density and high output power. Therefore, in recent years, the lithium ion secondary battery has been used in various fields. For example, as an energy source for an electric power-assisted bicycle, a battery pack in which a plurality of secondary unit batteries, such as lithium ion batteries, is connected in series may be used.

For the exterior of a secondary unit battery that is used in the above-described manner, a laminate film casing material, which is made of a metallic laminate film, is used in many cases because of the following advantages: the laminate film casing material has a high degree of freedom in shape and is lightweight.

For example, what is disclosed in FIGS. 3 and 4 of Patent Document 1 (JP-A-2010-170799) is an assembled battery 23 in which a plurality of unit batteries 21, which are made from flat non-aqueous electrolyte batteries having a laminate film casing material, is stacked in such a way that negative terminals 6 and positive terminals 7, which extend out of the unit batteries 21, are arranged in the same direction, with an adhesive tape 22 binding the unit batteries 21 together. In the assembled battery 23, a plurality of unit batteries 21 is electrically connected in series to each other.

A battery pack disclosed in Patent Document 1 adopts the following structure: a plurality of unit batteries 21, which are stacked in such a way that the negative terminals 6 and the positive terminals 7 are arranged in the same direction, is electrically connected in series. In order for the unit batteries 21 to be connected in series, the electrodes of different polarities of adjoining unit batteries 21 need to be connected to each other. However, in the battery pack disclosed in Patent Document 1, electric connection sections of the adjoining unit batteries 21 are each disposed obliquely with respect to a direction in which the unit batteries 21 are stacked.

Moreover, as for the flat unit batteries 21 having a laminate film casing material as disclosed in Patent Document 1, the distance between electrodes of the adjoining unit batteries 21 is very short. For the above reason, in a process of producing the battery pack disclosed in Patent Document 1, attention needs to be paid to the following when the electrodes of adjoining unit batteries 21 are connected: a short-circuit between electrodes that are disposed in a small space at a time when the unit batteries 21 are sequentially connected obliquely with respect to the stacking direction. Therefore, the problem is that work efficiency is poor, and that productivity is low.

SUMMARY OF THE INVENTION

The present invention is intended to solve the above problems. A battery pack of the present invention includes: a plurality of unit batteries that include a positive-electrode pulled-out tab and a negative-electrode pulled-out tab; and a board on which pulled-out tab connection sections are formed to connect the pulled-out tabs of different polarities of adjacent unit batteries.

Moreover, in the battery pack of the present invention, a divider piece is provided between the pulled-out tab connection sections.

Moreover, the battery pack of the present invention includes: a positive electrode washer that is provided on one end portion of the board; a negative electrode washer that is provided on the other end portion that is different from one end portion of the board; a positive-electrode pulled-out tab/positive electrode washer connection section that connects the positive-electrode pulled-out tab of the unit battery, which is disposed on one end portion of the board, to the positive electrode washer; and a negative-electrode pulled-out tab/negative electrode washer connection section that connects the negative-electrode pulled-out tab of the unit battery, which is disposed on the other end portion of the board, to the negative electrode washer.

Moreover, in the battery pack of the present invention, the positive-electrode and negative-electrode pulled-out tabs of the unit battery, which is disposed on one end portion of the board, are both bent in the same direction.

Moreover, in the battery pack of the present invention, the positive-electrode and negative-electrode pulled-out tabs of the unit battery, which is disposed on the other end portion of the board, are both bent in the same direction.

Moreover, in the battery pack of the present invention, the positive-electrode and negative-electrode pulled-out tabs of the unit battery, whose pulled-out tabs are connected by the pulled-out tab connection section, are bent in opposite directions.

Moreover, in the battery pack of the present invention, the height of the divider piece from the board is higher than the height of a bolt used to connect pulled-out tabs in the pulled-out tab connection section.

Moreover, the battery pack of the present invention includes a holder member that is fixed to the board and includes holes into which the positive-electrode and negative-electrode pulled-out tabs of a plurality of the unit batteries are inserted.

Moreover, in the battery pack of the present invention, guide projecting sections are provided on the holder member in such a way that the holes are sandwiched therebetween.

Moreover, in the battery pack of the present invention, tapered sides are provided on the guide projecting sections.

Moreover, in the battery pack of the present invention, the pulled-out tabs of different polarities of adjacent unit batteries are connected in the pulled-out tab connection section with connection members, a plurality of the holes are provided on the holder member, and bridging structure sections are provided between a plurality of the holes.

Moreover, in the battery pack of the present invention, the connection members are bolts and nuts.

Moreover, in the battery pack of the present invention, nut housing sections are provided in the bridging structure sections to house the nuts.

Moreover, in the battery pack of the present invention, a divider piece, which is disposed between the pulled-out tab connection sections, is provided in the bridging structure section.

Moreover, in the battery pack of the present invention, a positioning projecting section is provided in the bridging structure section and used to position the board and the holder member.

Moreover, in the battery pack of the present invention, a screw hole, into which a fixing screw for fixing the board to the holder member is screwed, is provided in the bridging structure section.

According to the battery pack of the present invention, the pulled-out tabs of different polarities of a plurality of unit batteries are connected on the board. Therefore, the production of battery packs is highly efficient, resulting in an improvement in productivity.

Moreover, according to the battery pack of the present invention, the positive-electrode and negative-electrode pulled-out tabs of a plurality of unit batteries are inserted into the holes of the holder member, and the pulled-out tabs of different polarities of a plurality of the unit batteries are connected on the board. Therefore, the production of battery packs is highly efficient, resulting in an improvement in productivity.

Moreover, according to the battery pack of the present invention, the positive-electrode and negative-electrode pulled-out tabs of a plurality of unit batteries are inserted into the holes of the holder member, and the pulled-out tabs of different polarities of a plurality of the unit batteries are connected on the board with bolts and nuts. Therefore, it is easy to connect a plurality of the unit batteries electrically. Thus, the production of battery packs is highly efficient, resulting in an improvement in productivity.

DESCRIPTION OF EXEMPLARY EMBODIMENTS

Figure 1:
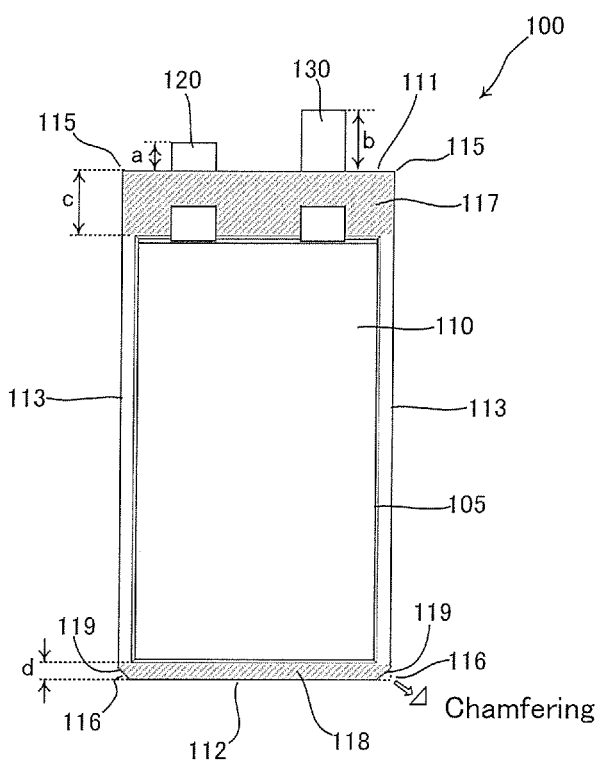
FIG. 1 is a diagram showing a unit battery 100, which makes up a battery pack according to an embodiment of the present invention.

The following describes an embodiment of the present invention with reference to the accompanying drawings. FIG.

1 is a diagram showing a unit battery 100 that makes up a battery pack according to an embodiment of the present invention. What is used for the unit battery 100 is a lithium ion secondary unit battery in which charge and discharge take place as lithium ions move between negative and positive electrodes.

A battery main unit 110 of the unit battery 100 has a structure in which the following components are stored in a laminate film casing material, which is in the shape of a rectangle in planar view: an electrode laminated body, in which a plurality of sheet positive electrodes and a plurality of sheet negative electrodes are stacked via separators, and an electrolytic solution (both not shown). From a first end portion 111 of the battery main unit 110, a positive-electrode pulled-out tab 120 and a negative-electrode pulled-out tab 130 are pulled out.

The positive-electrode pulled-out tab 120 and the negative-electrode pulled-out tab 130 are both in the shape of a flat plate, and are each connected directly, or via a lead body or the like, to the sheet positive electrodes and the sheet negative electrodes in the laminate film casing material. The laminate film casing material includes a metallic laminate film having a heat-sealing resin layer on a plane facing the inside of the battery. More specifically, for example, the laminate film casing material is made by stacking two metallic laminate films; after an electrode laminated body, which includes the sheet positive electrodes, sheet negative electrodes and separators, and an electrolytic solution are stored in the laminate film casing material, the periphery of the laminate film casing material (the first end portion 111, a second end portion 112 and two side end portions 113) is heat-sealed. Therefore, the inside thereof is hermetically sealed.

In this case, a metallic piece that is pulled out of the battery main unit 110, which includes laminate film casing materials such as the positive-electrode pulled-out tab 120 and the negative-electrode pulled-out tab 130, is referred to as a "pulled-out tab." The sheet positive electrodes and sheet negative electrodes that are stacked via separators or electrolytic solution inside the laminate film casing material are referred to as "electrodes."

Incidentally, the electrode laminated bodies include not only the one in which a plurality of sheet positive electrodes and a plurality of sheet negative electrodes are stacked via separators as described above but also a laminated body in which the sheet positive electrodes and the sheet negative electrodes are stacked via separators, wound around and compressed.

In the above unit battery 100, aluminum or aluminum alloy is used as a material of the positive-electrode pulled-out tab 120. As a material of the negative-electrode pulled-out tab 130, the following are generally used: nickel; a material made by plating another metal with nickel (which is a nickel-plated material, for example, nickel-plated copper); a clad made of nickel and another metal (a nickel-clad material, for example, nickel-copper clad). That is, the unit battery 100 is so formed as to include the positive-electrode pulled-out tab 120 containing aluminum and the negative-electrode pulled-out tab 130 containing nickel. According to the present embodiment, the positive-electrode pulled-out tab 120 made of aluminum and the negative-electrode pulled-out tab 130 made of nickel are used.

In order to make a battery pack of the present invention, a positive-electrode pulled-out tab 120 of a unit battery 100 and a negative-electrode pulled-out tab 130 of a unit battery 100, which is adjacent to the above unit battery 100, are mechanically bound together with bolts and nuts and therefore connected together electrically.

In this case, the structure in which the positive-electrode pulled-out tab 120, which contains aluminum, of the unit battery 100 and the negative-electrode pulled-out tab 130, which contains nickel, are mechanically bound together could lead to a decline in conductivity after a predetermined period of time has passed due to problems pertaining to differences in potential.

Accordingly, in the battery pack of the present invention, an adding tab 125 containing nickel is welded to the positive-electrode pulled-out tab 120 of the unit battery 100. When a plurality of unit batteries 100 is connected in series, the adding tab 125 of one unit battery 100 described above is connected to the negative-electrode pulled-out tab 130 of the other unit battery 100, thereby solving the problem of a decline in conductivity that arises from problems pertaining to differences in potential.

Figure 2:
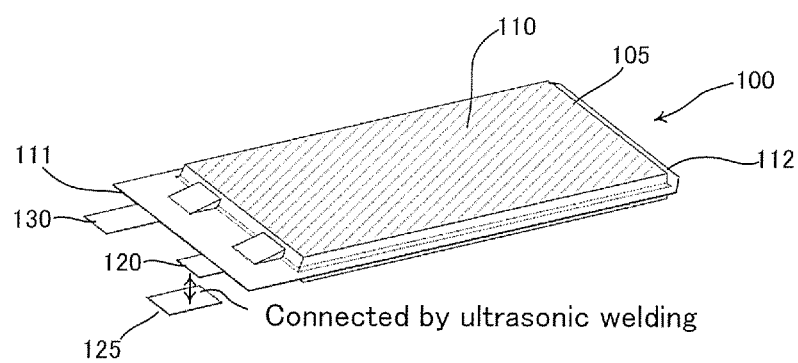
FIG. 2 is a diagram showing how an adding tab member 125 is connected to a positive-electrode pulled-out tab 120 of the unit battery 100.
Figure 3:
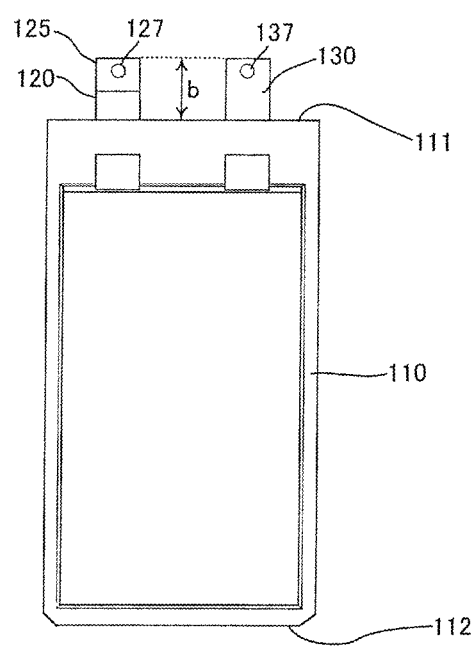
FIG. 3 is a diagram showing how holes are provided on a positive-electrode pulled-out tab and a negative-electrode pulled-out tab before unit batteries 100 are connected in series.

The configuration to achieve the above will be described. As shown in FIG. 1, in a process of making the battery pack, suppose that the aluminum positive-electrode pulled-out tab 120 of the unit battery 100 has a length of a from the first end portion 111, and the nickel negative-electrode pulled-out tab 130 a length of b (b>a) from the first end portion 111. Then, to the aluminum positive-electrode pulled-out tab 120 having a length of a, an adding tab member 125 made of nickel is connected and added by ultrasonic welding so that the length from the first end portion 111 comes to b (see FIGS. 2 and 3). In order to allow unit batteries 100 to be connected in series, a hole 127 is made on the adding tab member 125, which serves as a positive-electrode pulled-out tab; a hole 137 is made on the negative-electrode pulled-out tab 130. Incidentally, hereinafter, the entire pulled-out tab, which is formed by connecting the adding tab member 125, may also be referred to as a positive-electrode pulled-out tab 120.

As described below, in the battery pack of the present invention, in a process of electrically connecting a plurality of unit batteries 100, the pulled-out tabs are mechanically connected together in such a way that the members containing nickel (the adding tab members 125 and the negative-electrode pulled-out tabs 130) come in contact with each other. Accordingly, the electrically connected portions of the adjoining unit batteries turn out to be the portions that are made of the same type of metallic material and are connected electrically. Therefore, the problems pertaining to differences in potential do not arise, and it is substantially possible to prevent a decline over time in conductivity from occurring.

Figure 4:
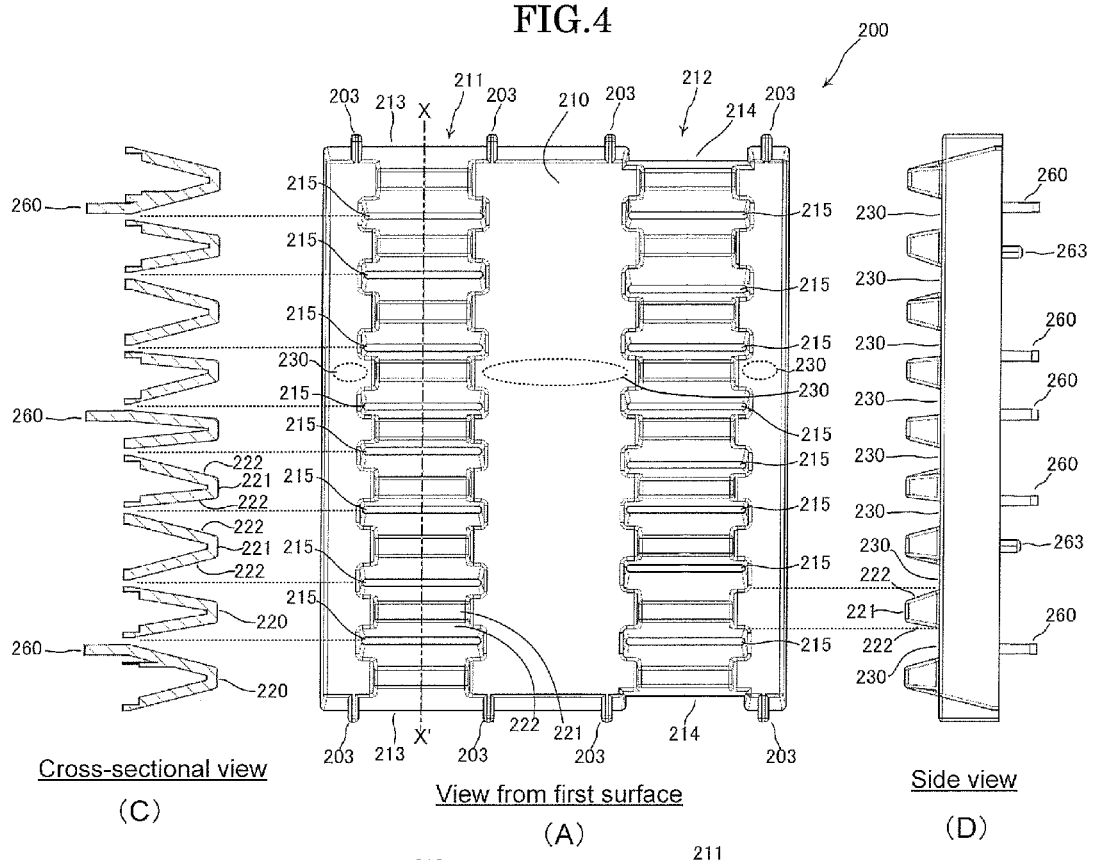
FIGS. 4A to 4D are diagrams illustrating a holder member 200, which is used to form the battery pack according to the embodiment of the present invention.
Figure 4:
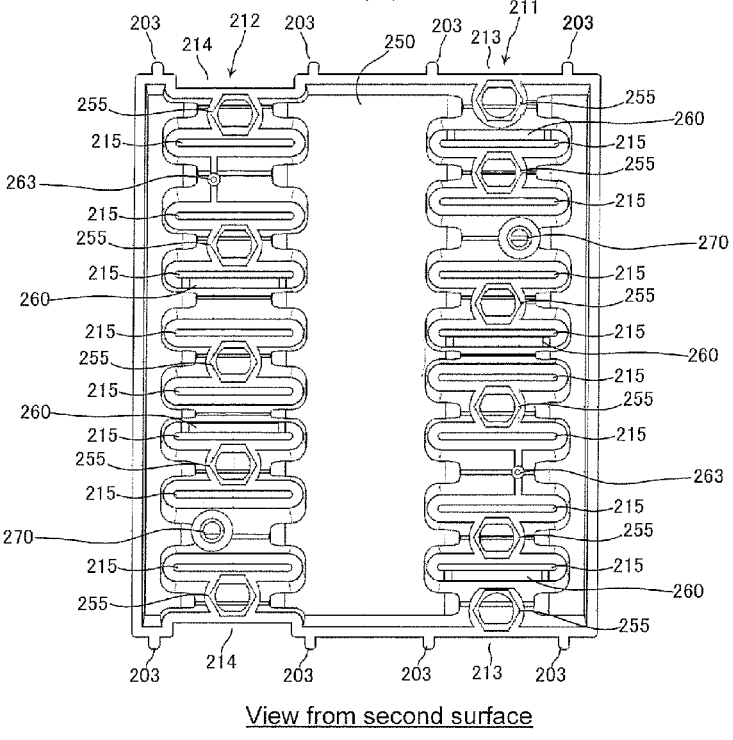

The following describes a holder member 200, which is used in electrically connecting the positive-electrode pulled-out tabs and negative-electrode pulled-out tabs of a plurality of unit batteries 100 in the battery pack of the embodiment of the present invention. FIGS. 4A to 4D are diagrams illustrating the holder member 200. FIG. 4A is a diagram showing the holder member 200 seen from a first main surface side. FIG. 4B is a diagram showing the holder member 200 seen from a second main surface side.

FIG. 4C is a cross-sectional view of FIG. 4A taken along X-X'. FIG. 4D is a side view of the holder member 200.

On the holder member 200, a first surface 210 and a second surface 250, which is on the opposite side of the holder member 200 from the first surface 210, are formed; the holder member 200 is a member made of synthetic resin such as ABS resin. In a first row 211 of the first surface 210 of the holder member 200, pulled-out tab insertion holes 215 are formed side by side from top to bottom as shown in FIG. 4A. Similarly, in a second row 212 of the first surface 210, pulled-out tab insertion holes 215 are formed side by side from top to bottom. When a unit battery 100 is attached to the holder member 200, the pulled-out tab insertion holes 215 provided on the first surface 210 are used. The pulled-out tab insertion holes 215 are holes passing therethrough from the first surface 210 to the second surface 250; and holes into which the pulled-out tabs of the unit battery 100 can be inserted.

As shown in FIG. 4A, on the upper and lower sides of the first and second rows 211 and 212, pulled-out tab guide ribs 203 are provided. A pulled-out tab guidance section 213 is provided in such a way that the pulled-out tab guidance section 213 is sandwiched between the pulled-out tab guide ribs 203 of the first row 211. Moreover, a pulled-out tab guidance concave section 214 is provided in such a way that the pulled-out tab guidance concave section 214 is sandwiched between the pulled-out tab guide ribs 203 of the second row 212.

In the first row 211, based on regulations by the pulled-out tab guide ribs 203, a pulled-out tab of an edge-side unit battery 100, out of a plurality of unit batteries 100 connected in series, is guided to the second surface 250 from the first surface 210 via the pulled-out tab guidance section 213.

In the second row 212, based on regulations by the pulled-out tab guide ribs 203, a pulled-out tab of an edge-side unit battery 100, out of a plurality of unit batteries 100 connected in series, is guided to the second surface 250 from the first surface 210 via the pulled-out tab guidance concave section 214.

Among a plurality of unit batteries 100 connected in series, a pulled-out tab of a unit battery 100 that is not on the edge sides (which are the upper and lower sides of the holder member 200 as shown in FIG. 4A) passes through the pulled-out tab insertion hole 215 and is attached to the holder member 200. In the upper and lower areas of the pulled-out tab insertion hole 215 (as shown in FIG. 4A), pulled-out tab guide projecting sections 220 are provided in such a way that the pulled-out tab insertion hole 215 is sandwiched between the pulled-out tab guide projecting sections 220, which are positioned on the upper and lower sides of the pulled-out tab insertion hole 215. The pulled-out tab guide projecting sections 220 are generally made up of a top section 221 and two tapered sides 222, which are seamlessly connected to the top section 221. When a pulled-out tab of a unit battery 100 is inserted into a pulled-out tab insertion hole 215, a space between the two tapered sides 222 becomes gradually narrower, making it easy to attach the unit battery 100 to the holder member 200. Therefore, it is possible to improve efficiency in connecting a plurality of unit batteries 100 in series and increase productivity.

A flat surface between two upper and lower pulled-out tab guide projecting sections 220 serves as a bumping section 230: the bumping section 230 regulates the position of the first end portion 111 as the first end portion 111 of the unit battery 100 comes in contact with the bumping section 230 at a time when the pulled-out tab of the unit battery 100 is inserted into the pulled-out tab insertion hole 215.

The bumping sections 230 enable the unit batteries 100 to be easily positioned in the stacking direction as the first end portions 111 of the unit batteries 100 come in contact with the bumping sections 230. Therefore, it is possible to improve efficiency in producing the battery pack and increase productivity.

Incidentally, according to the present embodiment, the bumping sections 230 are flat surfaces. However, the bumping sections 230 are not necessarily limited to such a shape. The bumping sections 230 can take any shape as long as it is possible to regulate the position of the first end portions 111 of the unit batteries 100.

Among a plurality of unit batteries 100 connected in series, the unit batteries 100 disposed in both end portions cannot be handled by the above bumping sections 230 in such a way that the positions of the first end portions 111 of the unit batteries 100 are regulated. Instead, the first end portions 111 come in contact with the pulled-out tab guide ribs 203 so that the unit batteries 100 disposed in both end portions are positioned. A surface, with which the first end portion 111 comes in contact, of the pulled-out tab guide rib 203 and a bumping portion 230 are provided on the same plane.

To the second surface 250 of the holder member 200, a board 300 can be attached. On the board 300, the pulled-out tabs of the adjacent unit batteries 100 are bent, put on each other and connected, resulting in an electrical connection. When the pulled-out tabs of the adjacent unit batteries 100 are connected, it is preferred that the pulled-out tabs be mechanically bound together with connection members, such as bolts and nuts. Accordingly, in the example shown in FIG. 4B, six nut housing sections 255 for housing nuts 256 are provided in the first row 211 of the second surface 250, and five in the second row 212. Moreover, on the second surface 250, divider pieces 260, which are designed to ensure insulation between the pulled-out tab connection sections of a unit battery 100 that are formed on the board 300 or between pulled-out tab connection sections and pulled-out tabs, are provided at three locations in the first row 211 and at two locations in the second row 212.

Positioning projecting sections 263 are projections that help position the board 300 when the board 300 is attached to the holder member 200; one positioning projection section 263 is positioned in the first row 211, and the other in the second row 212. Moreover, one screw hole 270, which is used to bind the board 300 and the holder member 200 together after the board 300 is attached to the holder member 200 with the use of the above positioning projecting sections 263, is provided in the first row 211, and the other in the second row 212. In the example here, bolts and nuts are used as the connection members. However, instead of bolts and nuts, caulking pins, rivets or other tools may be used as the connection members.

Figure 5:
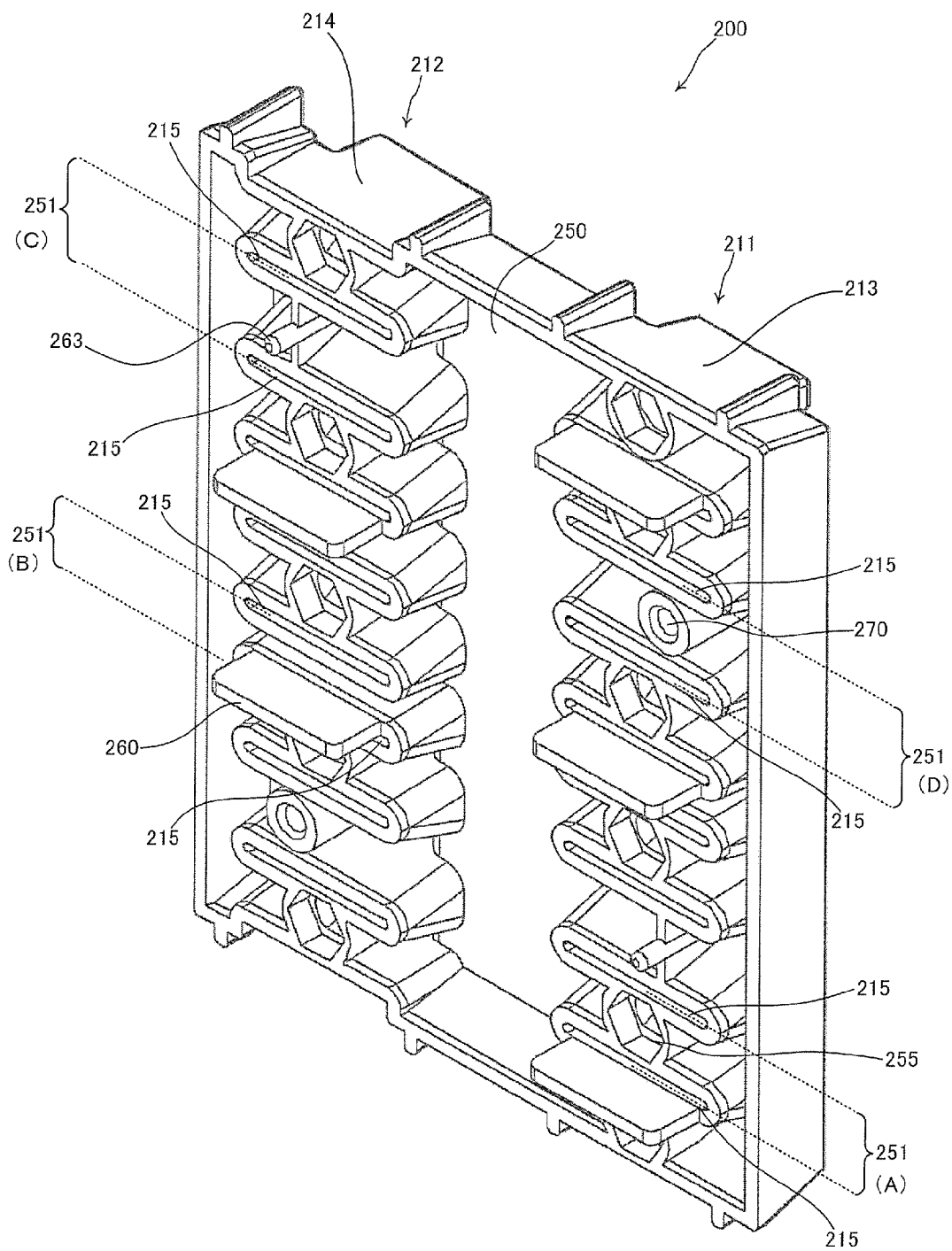
FIG. 5 is a perspective view of the holder member 200, which is used to form the battery pack according to the embodiment of the present invention.

FIG. 5 is a perspective view of the holder member 200, which is used to make the battery pack according to the embodiment of the present invention. Eight pulled-out tab insertion holes 215 are provided in the first row 211 of the second surface 250 of the holder member 200. Similarly, eight pulled-out tab insertion holes 215 are provided in the second row 212. A structure between the adjoining pulled-out tab insertion holes 215 in each row is made of the same resin as that of the main unit and is formed integrally with the main unit. The structure is referred to as a bridging structure section 251.

One main feature of the present embodiment is to give the bridging structure section 251 various functions.

For example, as for the bridging structure section 251 shown in FIG. 5A, a nut housing section 255 for housing a nut 256 is provided in the bridging structure section 251. The bridging structure section 251 described above is effective in increasing the rigidity of the holder member 200, and can provide a space in which the nut 256 is stored. Therefore, it is possible to make effective use of the space.

Moreover, for example, in the bridging structure section 251 shown in FIG. 5B, a divider piece 260 is provided so as to be disposed between the pulled-out tab connection sections. The bridging structure section 251 described above is effective in increasing the rigidity of the holder member 200, and can provide a space in which the divider piece 260 stands. Therefore, it is possible to make effective use of the space.

Moreover, for example, in the bridging structure section 251 shown in FIG. 5C, a positioning projecting section 263, which is used in positioning the board 300 and the holder member 200, is provided. The bridging structure section 251 described above is effective in increasing the rigidity of the holder member 200, and can provide a space in which the positioning projecting section 263 stands. Therefore, it is possible to make effective use of the space.

Moreover, for example, in the bridging structure section 251 shown in FIG. 5D, a screw hole 270, into which a board fixing screw 271 is screwed to fix the board 300 to the holder member 200, is provided. The bridging structure section 251 described above is effective in increasing the rigidity of the holder member 200, and can provide a space for the screw hole 270. Therefore, it is possible to make effective use of the space.

Figure 6:
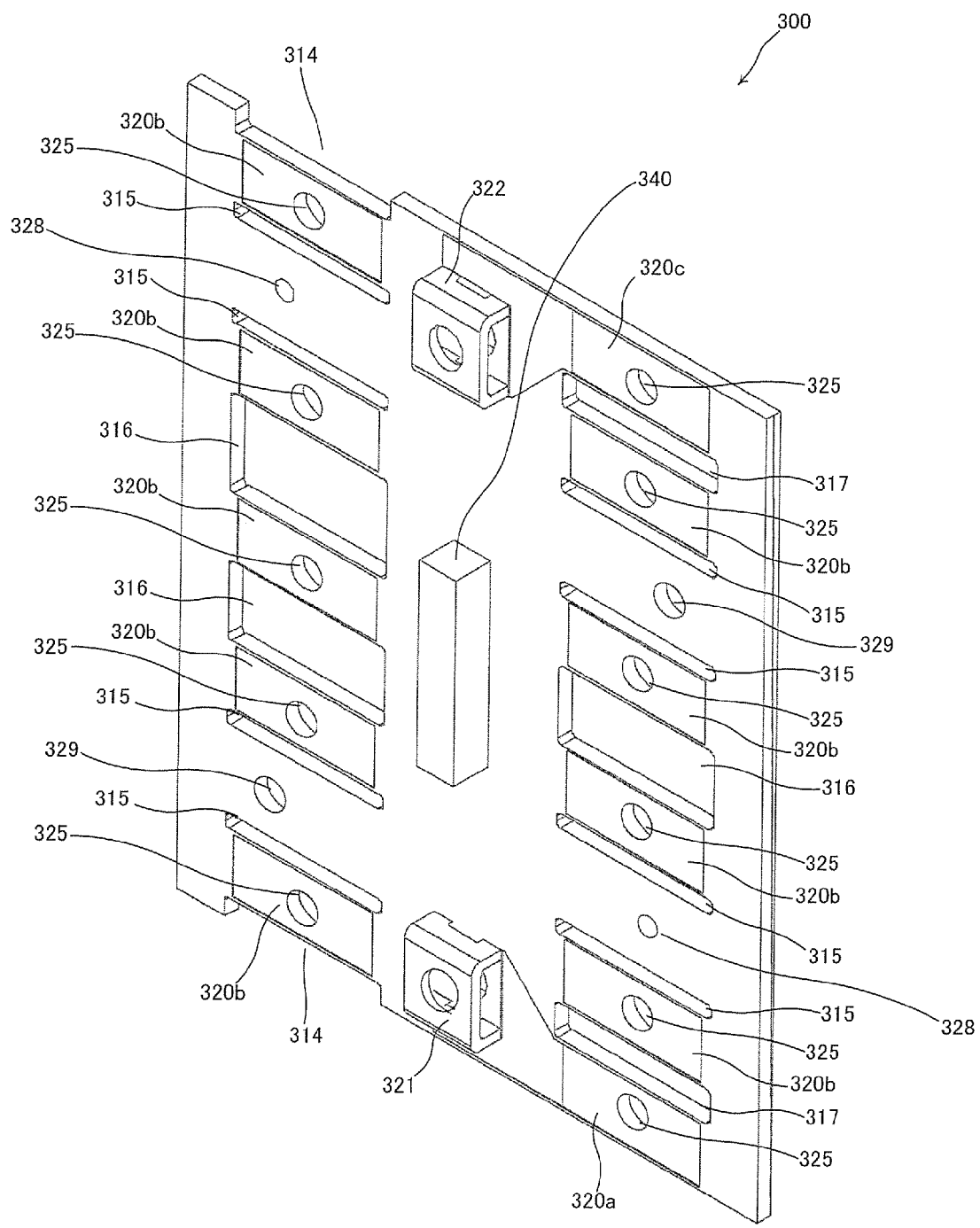
FIG. 6 is a perspective view of a board 300, which is used to connect unit batteries 100 in series in the battery pack according to an embodiment of the present invention.

The following describes the configuration of the board 300 on which connection sections for the pulled-out tabs of a plurality of unit batteries 100 are formed in the battery pack of the embodiment of the present invention. FIG. 6 is a perspective view of the board 300 that is used in connecting unit batteries 100 in series in the battery pack of the embodiment of the present invention.

The board 300, which is made by mainly using glass epoxy or the like as base material, is attached to the second surface 250 of the holder member 200 before being used. The peripheral shape of the board 300 substantially matches the peripheral shape of the second surface 250 of the holder member 200. At two locations on the periphery of the board 300, pulled-out tab guidance notch sections 314 are formed so as to correspond to the pulled-out tab guidance concave sections 214 of the holder member 200.

Moreover, on the board 300, pulled-out tab extraction holes 315 are provided so as to correspond to the pulled-out tab insertion holes 215 of the holder member 200. Moreover, on the board 300, divider piece extraction holes 317 are provided so as to correspond to the divider pieces 260 of the holder member 200. Furthermore, on the board 300, pulled-out tab/divider piece extraction holes 316 are provided to support both the pulled-out tab insertion holes 215 and divider pieces 260 of the holder member 200. The above holes are all through-holes that pass through the board 300 from one main surface to the other main surface; and are so formed that the pulled-out tabs of unit batteries 100, the divider pieces 260 and the like can be inserted therein.

In areas where the pulled-out tabs of unit batteries 100 are fixed to the board 300 through connection members, the following sections are provided: thin-film electrode sections 320a, 320b and 320c. It is preferred that bolts and nuts be used in combination as connection members; the reason is that with bolts and nuts, the pulled-out tabs are easily and firmly fixed to the board 300. However, instead of bolts and nuts, caulking pins, rivets or other tools may be used as the connection members.

There is an electrical connection between a thin-film electrode section 320a and a metallic positive electrode washer 321, which is fixed to the board 300. There is an electrical connection between a thin-film electrode section 320c and a metallic negative electrode washer 322, which is fixed to the board 300. To the positive electrode washer 321 and the negative electrode washer 322, the pulled-out tabs of an edge portion of a unit battery 100 that is connected in series are connected. Therefore, the positive electrode washer 321 and the negative electrode washer 322 are used as terminals for charge and discharge of power for the battery pack.

Moreover, there is an electrical connection between a thin-film electrode section 320b and a terminal section, not shown, of a connector 340, allowing the potential for monitoring each unit battery 100 to be measured through the connector 340. Incidentally, the connector 340 may be formed so that a signal from a temperature measurement sensor (not shown) that measures temperatures of unit batteries 100 can be taken out.

For each of the thin-film electrode sections 320a, 320b and 320c, pulled-out tab connection screw holes 325 are provided: pulled-out tab connection bolts 257, which are used to fix the pulled-out tabs of unit batteries 100, are inserted into the pulled-out tab connection screw holes 325. To the thin-film electrode section 320a and the thin-film electrode section 320c, one pulled-out tab of an edge-portion unit battery 100, out of the unit batteries 100 connected in series, is fixed. Meanwhile, two thin-film electrode sections 320b are fixed in such a way that the pulled-out tabs of the adjoining unit batteries 100 are bent and put on each other.

On the board 300, two positioning holes 328 are formed so as to correspond to the positioning projecting sections 263 provided on the second surface 250 of the holder member 200. As the two positioning projecting sections 263 pass through the positioning holes 328, the holder member 200 and the board 300 can be easily positioned when being bound together, contributing to an improvement in productivity. Moreover, board fixing screw holes 329, which are formed on the board 300, are holes into which board fixing screws 271, which are used to fix the holder member 200 to the board 300, are inserted.

In the battery pack of the present invention, with the use of not only the board 300 but also the holder member 200, which is formed integrally with the board 300, the adjacent unit batteries 100 are connected. As a result, the unit batteries 100 are connected in series. According to the above configuration, the pulled-out tabs are tightly fixed between both surfaces of the board 300 with the help of connection members, such as bolts and nuts. Moreover, on a surface that is on the opposite side of the board 300 from a surface to which the tabs are fixed, the pulled-out tab guide projecting sections 220 ensure insulation between the pulled-out tabs of the unit battery 100. Thus, it is possible to provide a highly reliable battery pack.

Figure 7:
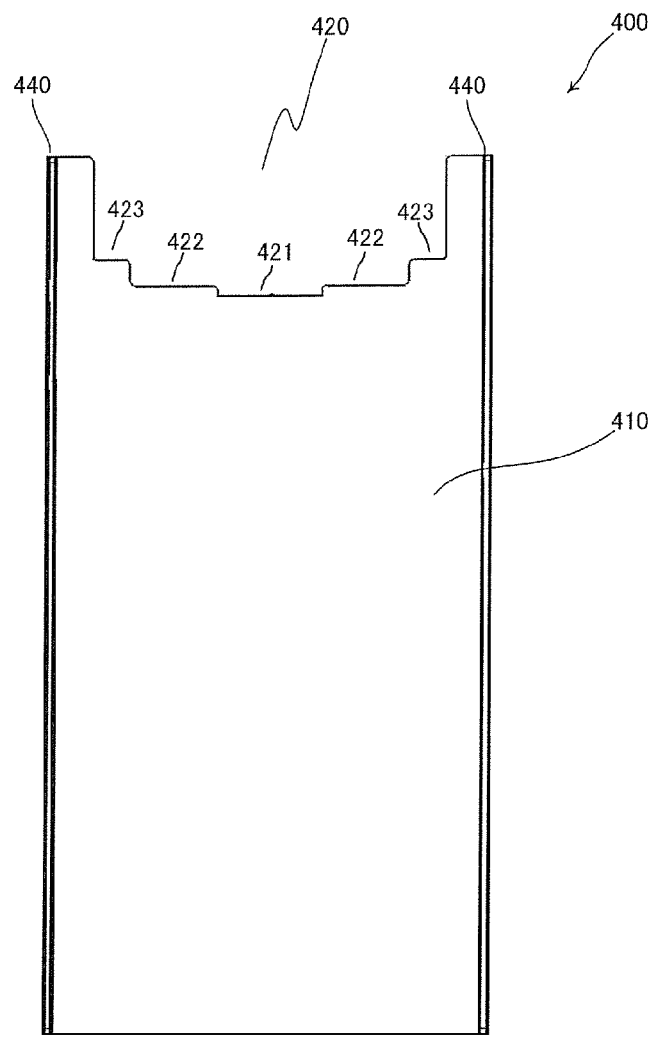
FIGS. 7A and 7B are diagrams illustrating a battery protective member 400, which is used to form the battery pack according to the embodiment of the present invention.
Figure 7:
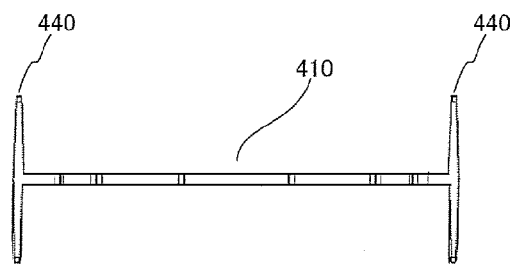

The following describes a battery protective member 400, which protects a plurality of unit batteries 100 at a time when the unit batteries 100 are connected in series and turned into a battery connecting structure 500 in the battery pack of the embodiment of the present invention. FIGS. 7A and 7B are diagrams illustrating the battery protective member 400, which is used to form the battery pack of the embodiment of the present invention. FIG. 7A is a diagram showing the battery protective member 400 in a way that faces a flat-plate section 410 to which a main surface of a unit battery 100 is bonded. FIG. 7B is a diagram showing the battery protective member 400 seen from an upper side of FIG. 7A.

For example, the battery protective member 400 is made of synthetic resin, such as ABS resin. When unit batteries 100 are stacked, the battery protective member 400 is inserted between the unit batteries 100 stacked before being used. The flat-plate section 410 of the battery protective member 400 is a member sandwiched between a unit battery 100 and a unit battery 100 that is connected in series to the unit battery 100. Meanwhile, protection-side plate sections 440 are so provided as to extend in a direction perpendicular to the flat-plate section 410 from both edge portions of the flat-plate section 410. Therefore, as shown in FIG. 7B, the cross-sectional surface of the battery protective member 400 is in the shape of "H."

Moreover, a notch section 420, which is made up of the following, is formed on the flat-plate section 410: a first notch section 421, which is the deepest notch section; second notch sections 422, which are disposed on both sides of the first notch section 421 and are the second deepest notch sections after the first notch section 421; and third notch sections 423, which are disposed on both sides of the second notch sections 422 and are the shallowest notch sections.

The following describes processes of producing, from each of the above members, a battery connecting structure 500 in which unit batteries 100 are connected, with reference to FIGS. 8 to 18. FIGS. 8 to 18 are diagrams illustrating the processes of producing the battery connecting structure 500, which makes up the battery pack of the embodiment of the present invention.

Figure 8:
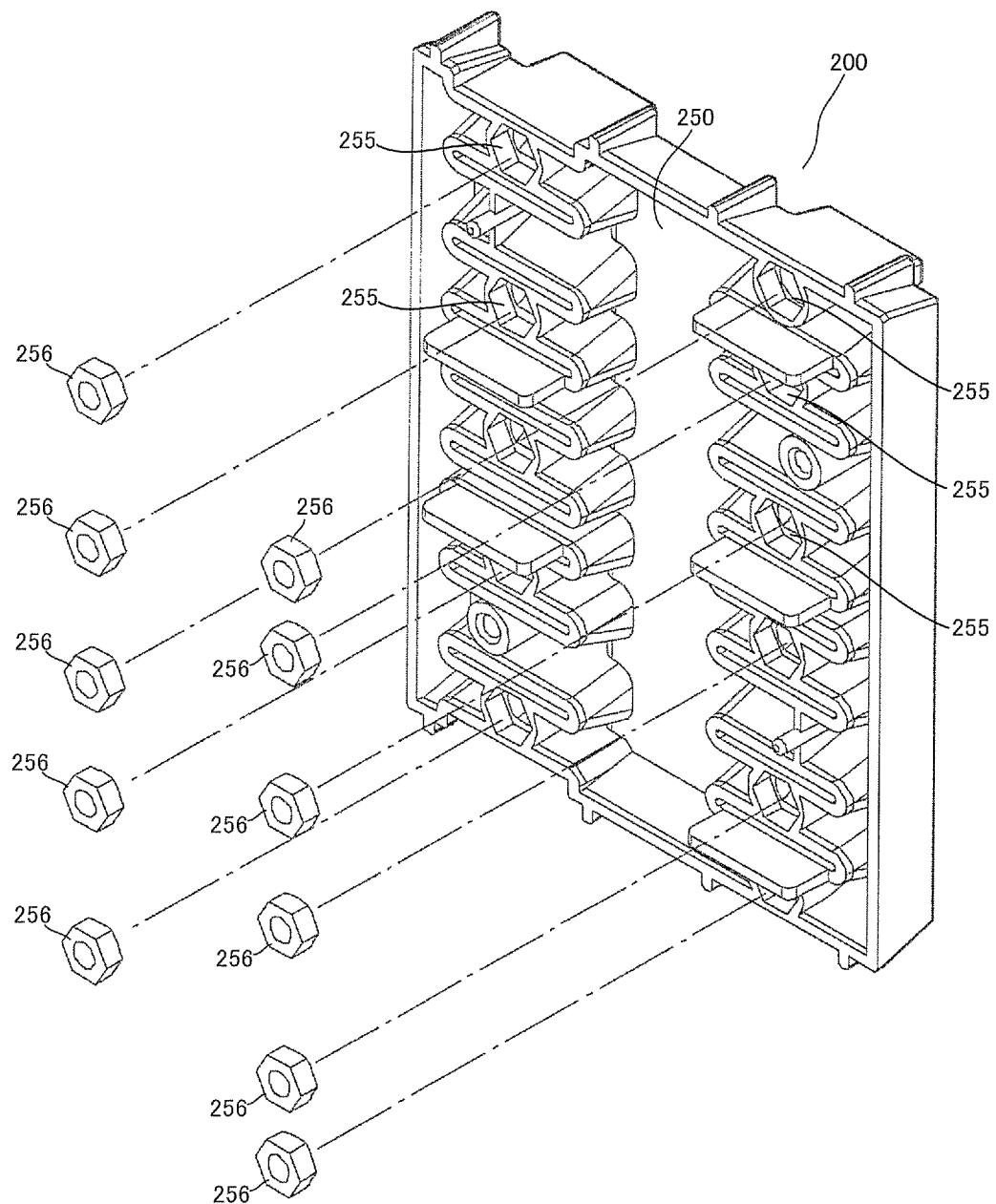
FIG. 8 is a diagram illustrating a process of producing a battery connecting structure 500, which makes up the battery pack according to the embodiment of the present invention.

First, in a process shown in FIG. 8, nuts 256 are mounted in all the nut housing sections 255, which are provided on the second surface 250 of the holder member 200. The dimensions of the inner periphery of the nut housing sections 255 are so set that the nuts 256 cannot be easily removed once the nuts 256 are placed into the nut housing sections 255.

Figure 9:
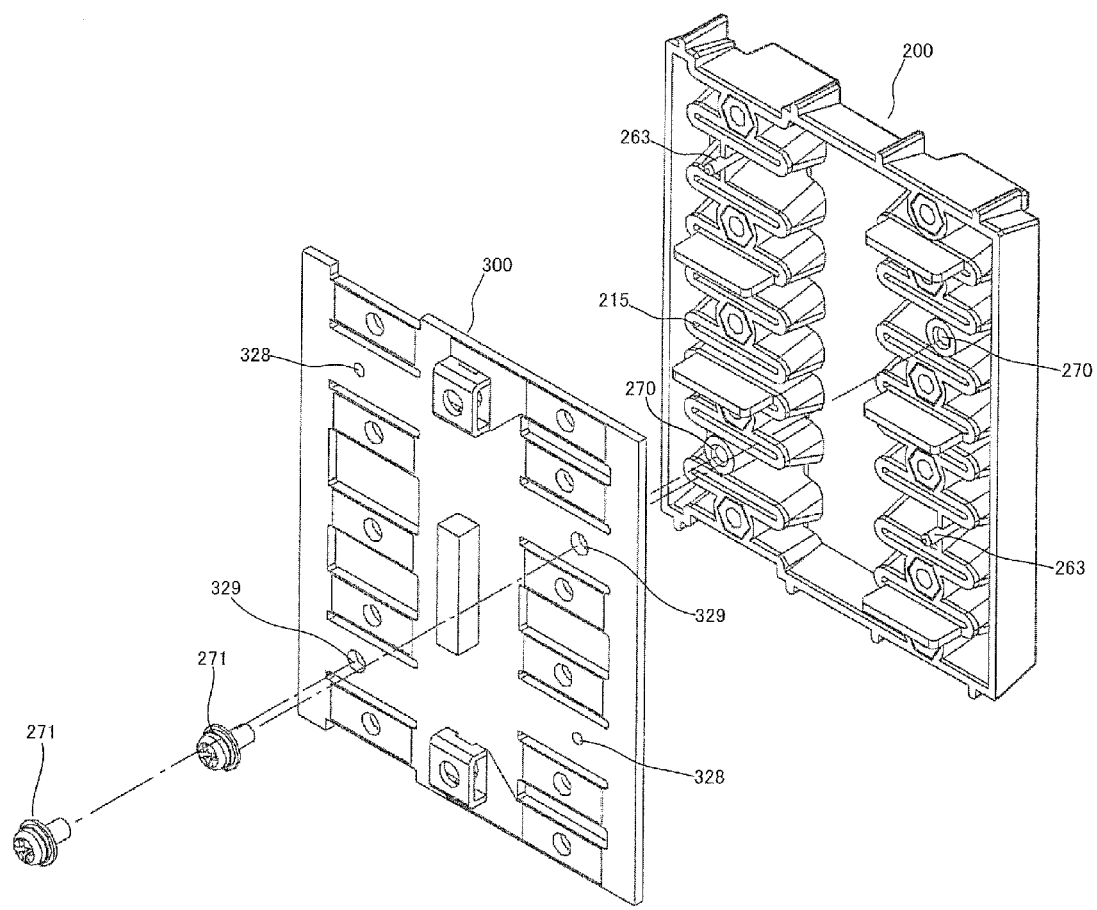
FIG. 9 is a diagram illustrating a process of producing the battery connecting structure 500, which makes up the battery pack according to the embodiment of the present invention.

In a subsequent process shown in FIG. 9, the positioning projecting sections 263 of the holder member 200 are inserted into the positioning holes 328 of the board 300 so that the holder member 200 and the board 300 are positioned. Subsequently, two board fixing screws 271 are inserted into the board fixing screw holes 329 and screwed into screw holes 270. As a result, the holder member 200 is fixed to the board 300. Incidentally, for the board fixing screw holes 329, various kinds of screw can be used. However, the use of tapping screws helps improve work efficiency during the production process.

Figure 10:
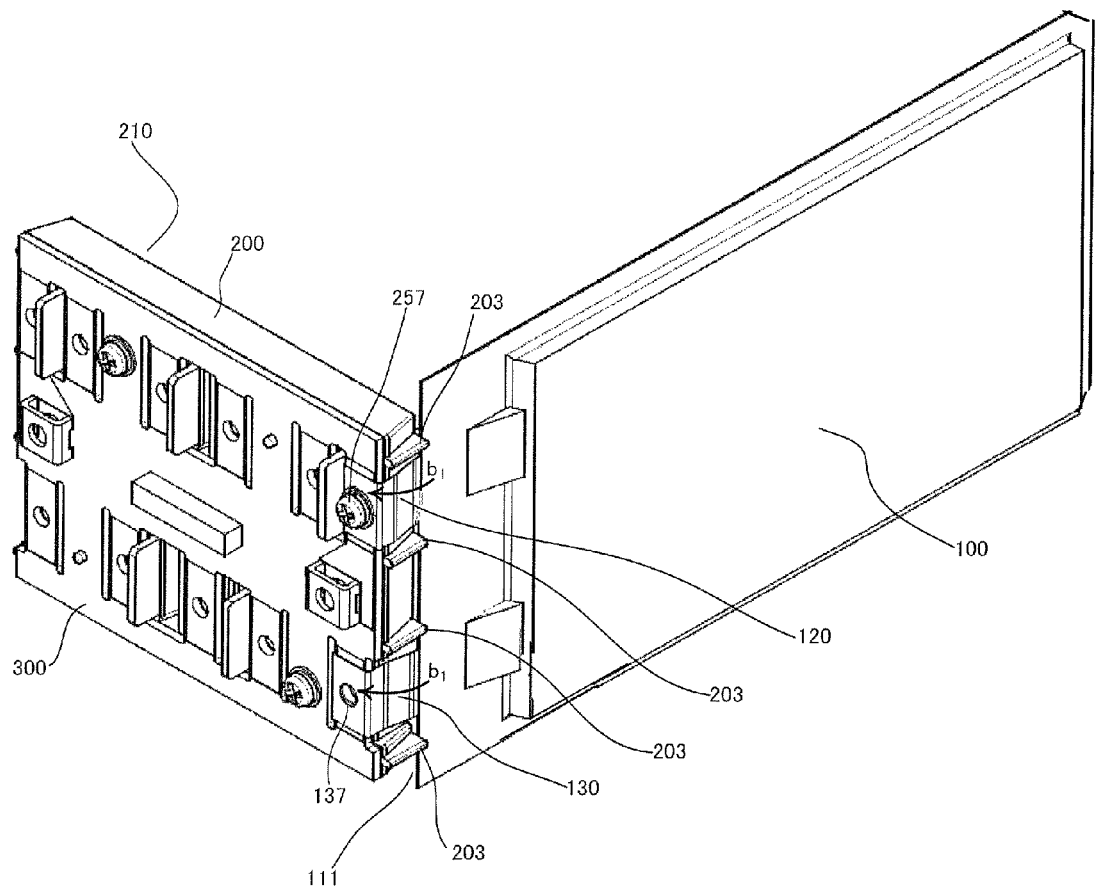
FIG. 10 is a diagram illustrating a process of producing the battery connecting structure 500, which makes up the battery pack according to the embodiment of the present invention.

In a subsequent process shown in FIG. 10, a unit battery 100 is disposed on the first surface 210 of the holder member 200. The unit battery 100 is positioned as the first end portion 111 of the unit battery 100 collides with the pulled-out tab guide rib 203. The negative-electrode pulled-out tab 130 of the unit battery 100 is then bent so as to come in contact with the thin-film electrode section 320*b* of the board 300 with the help of the pulled-out tab guidance concave section 214. Moreover, the positive-electrode pulled-out tab 120 of the unit battery 100 is bent so as to come in contact with the thin-film electrode section 320*a* of the board 300 with the help of the pulled-out tab guidance section 213. The pulled-out tab connection bolts 257 are inserted into the holes 127 of the positive-electrode pulled-out tab 120 and the pulled-out tab connection screw holes 325; the pulled-out tab connection bolts 257 are screwed into the nuts 256 housed in the nut housing sections 255. In this manner, the process of mounting the first unit battery 100 is completed.

Figure 11:
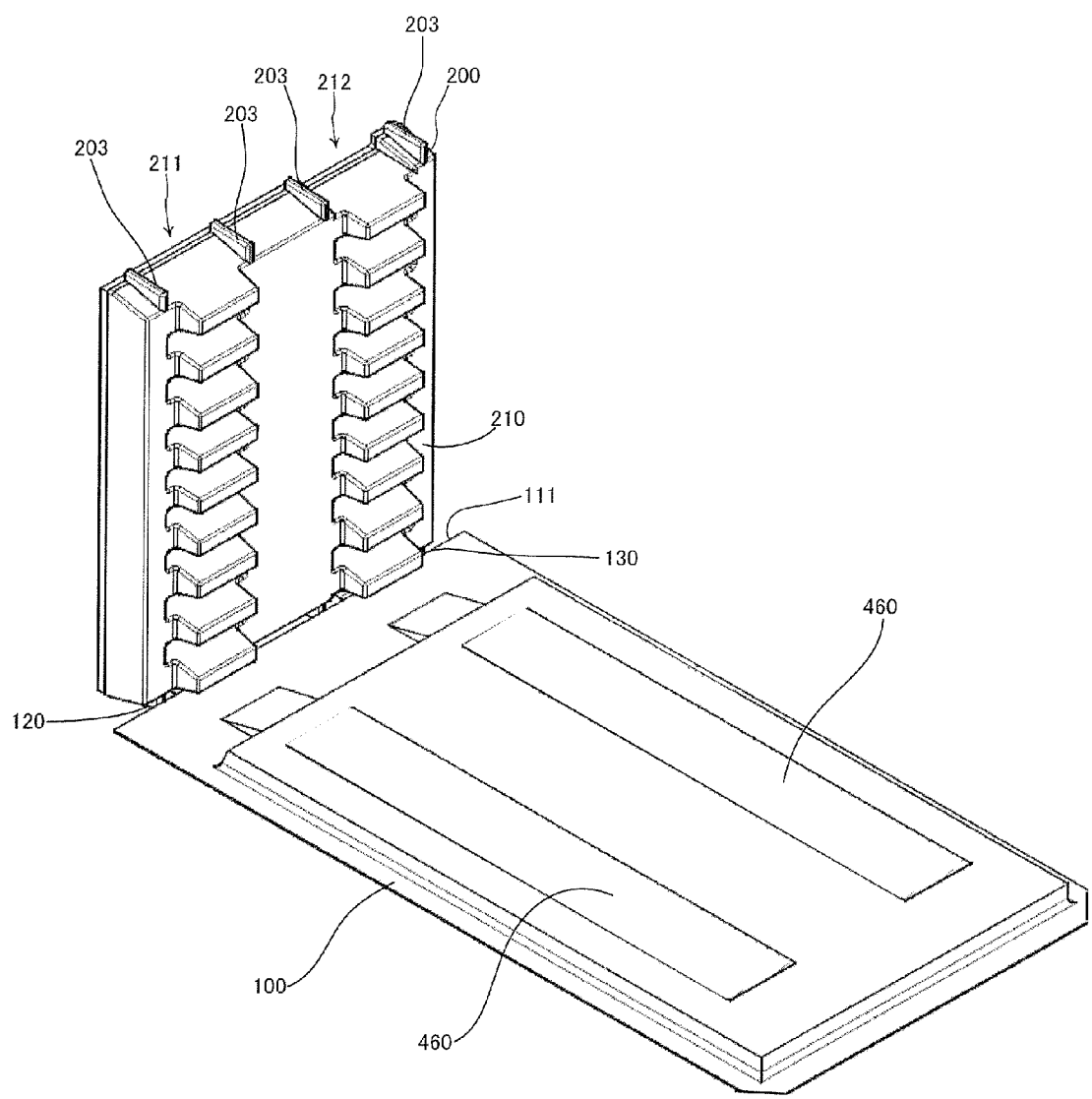
FIG. 11 is a diagram illustrating a process of producing the battery connecting structure 500, which makes up the battery pack according to the embodiment of the present invention.

A subsequent process shown in FIG. 11 takes place on the first surface 210 of the holder member 200. In the process, as shown in the diagram, two strips of two-sided adhesive tape 460 are attached to an upper main surface of the unit battery 100. The two-sided adhesive tapes 460 are used to fix the first unit battery 100, which is attached to the holder member 200, to a second unit battery 100, which is to be attached to the holder member 200. The reason the two strips of two-sided adhesive tape 460 are provided on the main surface of the unit battery 100 as shown in the diagram is to allow a spacer, described later, to be disposed between the two strips of two-sided adhesive tape 460 in order to improve productivity.

Figure 12:
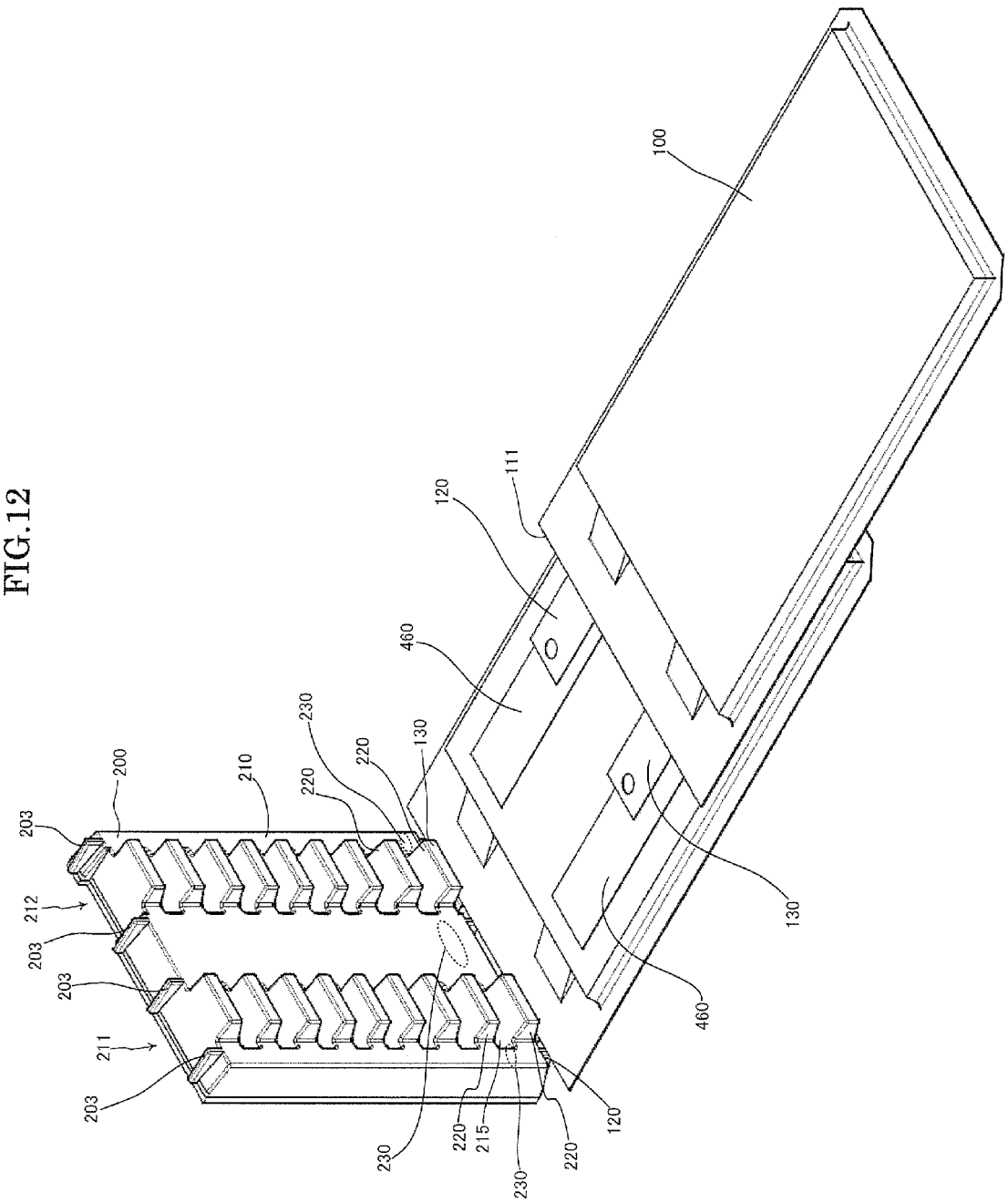
FIG. 12 is a diagram illustrating a process of producing the battery connecting structure 500, which makes up the battery pack according to the embodiment of the present invention.

In a subsequent process shown in FIG. 12, a spacer (not shown) that is thicker than the two-sided adhesive tapes 460 is placed on the first unit battery 100 attached. Furthermore, two pulled-out tabs of the second unit battery 100 are inserted into the pulled-out tab insertion holes 215 as the second unit battery 100 slides on the spacer. As described above, the pulled-out tab guide projecting sections 220 are disposed on the upper and lower sides of the two pulled-out tab insertion holes 215. Furthermore, the tapered sides 222 are provided on the pulled-out tab guide projecting sections 220. Therefore, a space between the upper and lower pulled-out tab guide projecting sections 220 becomes gradually narrower, enabling the pulled-out tabs of a unit battery 100 to be easily guided to the pulled-out tab insertion holes 215 of the holder member 200.

The bumping section 230 between the upper and lower pulled-out tab guide projecting sections 220 comes in contact with the first end portion 111 of the unit battery 100 as the pulled-out tabs (120, 130) of the unit battery 100 are inserted into the pulled-out tab insertion holes 215. Thus, the position of the first end portion 111 is regulated. In the holder member 200, such a bumping section 230 is provided. Therefore, it is easy to position a unit battery 100 in the stacking direction as the first end portion 111 of the unit battery 100 comes in contact with the bumping section 230. Thus, it is possible to increase efficiency in producing the battery pack and improve productivity.

After the first end portion 111 comes in contact with the bumping section 230 as described above, the spacer is removed. As a result, the first unit battery 100 attached and the second unit battery 100 attached are bonded together with the two-sided adhesive tape 460.

According to the present embodiment, two strips of two-sided adhesive tape 460 are attached to the main surface of the unit battery 100, and are used to bond unit batteries 100 together, thereby providing the battery pack with resistance to vibration. Preferred conditions for the above purpose will be described below.

Figure 27:
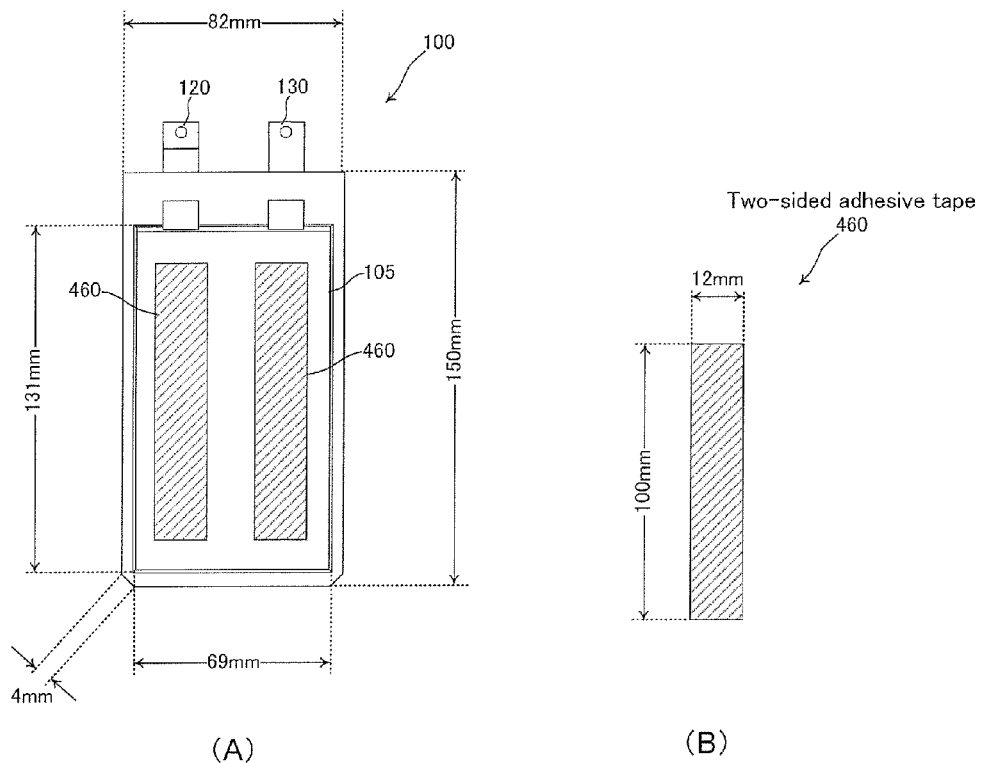
FIGS. 27A and 27B are diagrams illustrating conditions for bonding unit batteries 100 together.

FIGS. 27A and 27B are diagrams illustrating conditions for bonding unit batteries 100 together. FIG. 27A is a diagram showing the dimensions of a unit battery 100 that is used in the battery pack of the present embodiment. FIG. 27B is a diagram showing the dimensions of a two-sided adhesive tape 460 that is used in bonding unit batteries 100, which are used in the battery pack of the present embodiment.

As for the unit battery 100, the first end portion 111 is 82 mm in length. The side end portion 113 is 150 mm in length. Moreover, chamfered portions 119 are formed on both corner portions of the second end portion 112. Therefore, the outer circumference thereof is 459 mm in length.

Here, an electrode laminated area 105 in the unit battery 100 is defined. The electrode laminated area 105 is an area corresponding to a location where an electrode laminated body is stored: the electrode laminated body includes the sheet positive electrodes, sheet negative electrodes and separators, which are stored in the hermetically sealed unit battery 100 in a laminate film casing material. That is, the electrode laminated area 105 stores the electrode laminated body and therefore serves as a major flat surface area corresponding to a bulging portion of the laminate film casing material. The electrode laminated area 105 is a shaded area in FIG. 2, which is a perspective view of the unit battery 100. The electrode laminated area 105 is substantially in the shape of a rectangle: the long sides thereof are 131 mm in length, the short sides are 69 mm in length, and the outer circumference of the electrode laminated area 105 is 400 mm in length.

In a process of making the battery pack of the present embodiment, the two-sided adhesive tape 460 is used to bond the unit batteries 100 together. The dimensions of the two-sided adhesive tape 460 are as follows: the long sides are 100 mm in length, the short sides are 12 mm in length, and the outer circumference of one strip of two-sided adhesive tape 460 is 224 mm in length. According to the present embodiment, two strips of two-sided adhesive tape 460 are used. Therefore, the total outer circumference of the two-sided adhesive tapes 460 used to bond the batteries together is 448 mm in length.

A feature of the present embodiment is that the total outer circumference of the two-sided adhesive tapes 460 is set longer than the outer circumference of the electrode laminated area 105, which is an area corresponding to a location where the electrode laminated body is stored in the laminate film casing material. The above setting leads to an excellent result in a vibration test.

In the above-described battery pack of the present invention, the total outer circumference of the two-sided adhesive tapes 460 set longer than the outer circumference of the electrode laminated area 105, which is an area corresponding to a location where the electrode laminated body is stored in the laminate film casing material of the unit battery 100. Therefore, even when vibrations are applied, the unit batteries are not separated. Moreover, no stress is applied to a connection portion where pulled-out tabs are connected. Thus, it is possible to increase reliability. In addition, compared with the case where the batteries are bonded together in the strongest way, i.e. the case where the entire surfaces of the areas corresponding to the locations for storing electrode laminated bodies are bonded together, the stress that occurs at an end portion of a two-sided adhesive tape can be dispersed. Therefore, even when vibrations are applied to the battery pack, the laminate film casing material is less likely to suffer damage.

Incidentally, according to the present embodiment, to satisfy the above conditions, two strips of two-sided adhesive tape 460 are used. However, the two-sided adhesive tapes 460 are not limited to the form described above, as long as the total outer circumference of the two-sided adhesive tapes 460 is set longer than the outer circumference of the electrode laminated area 105 in the laminate film casing material of the unit battery 100. For example, a plurality of circular, patch-like two-sided adhesive tapes may be provided to increase the total outer circumference, thereby making it possible to meet the above conditions and improve productivity. Hereinafter, other examples of two-sided adhesive tapes 460 will be described as to shape.

Figure 28:
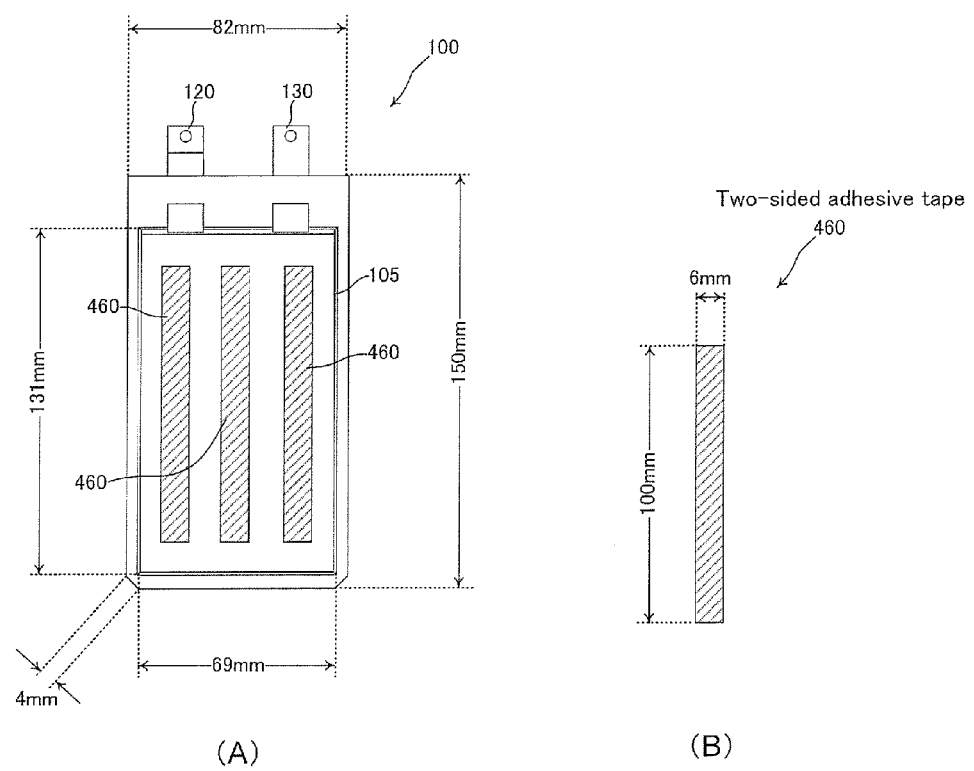
FIGS. 28A and 28B are diagrams illustrating another example of conditions for bonding unit batteries 100 together.

FIGS. 28A and 28B are diagrams illustrating another example of conditions for bonding unit batteries 100 together. FIG. 28A is a diagram showing the dimensions of a unit battery 100 that is used in the battery pack of the present embodiment. FIG. 28B is a diagram showing the dimensions of a two-sided adhesive tape 460 that is used in bonding together unit batteries 100, which are used in the battery pack of the present embodiment. The dimensions of the unit battery 100 are the same as those shown in FIG. 27A.

In the example shown in FIGS. 28A and 28B, in a process of making the battery pack, the dimensions of the two-sided adhesive tape 460, which is used to bond the unit batteries 100 together, are as follows: the long sides are 100 mm in length, the short sides are 6 mm in length, and the outer circumference of one strip of two-sided adhesive tape 460 is 212 mm in length. In the example shown in FIGS. 28A and 28B, three strips of two-sided adhesive tape 460 are used. Therefore, the total outer circumference of the two-sided adhesive tapes 460 used for bonding batteries together is 636 mm in length, and can be set longer than the outer circumference of the electrode laminated area 105, which is 400 mm in length. In this manner, even under the bonding conditions shown in FIGS. 28A and 28B, it is possible to achieve similar advantageous effects to those in the above-described embodiment.

FIGS. 29A and 29B are diagrams illustrating another example of conditions for bonding unit batteries 100 together. FIG. 29A is a diagram showing the dimensions of a unit battery 100 that is used in the battery pack of the present embodiment. FIG. 29B is a diagram showing the dimensions of a two-sided adhesive tape 460 that is used in bonding together unit batteries 100, which are used in the battery pack of the present embodiment. The dimensions of the unit battery 100 are the same as those shown in FIG. 27A.

Figure 29:
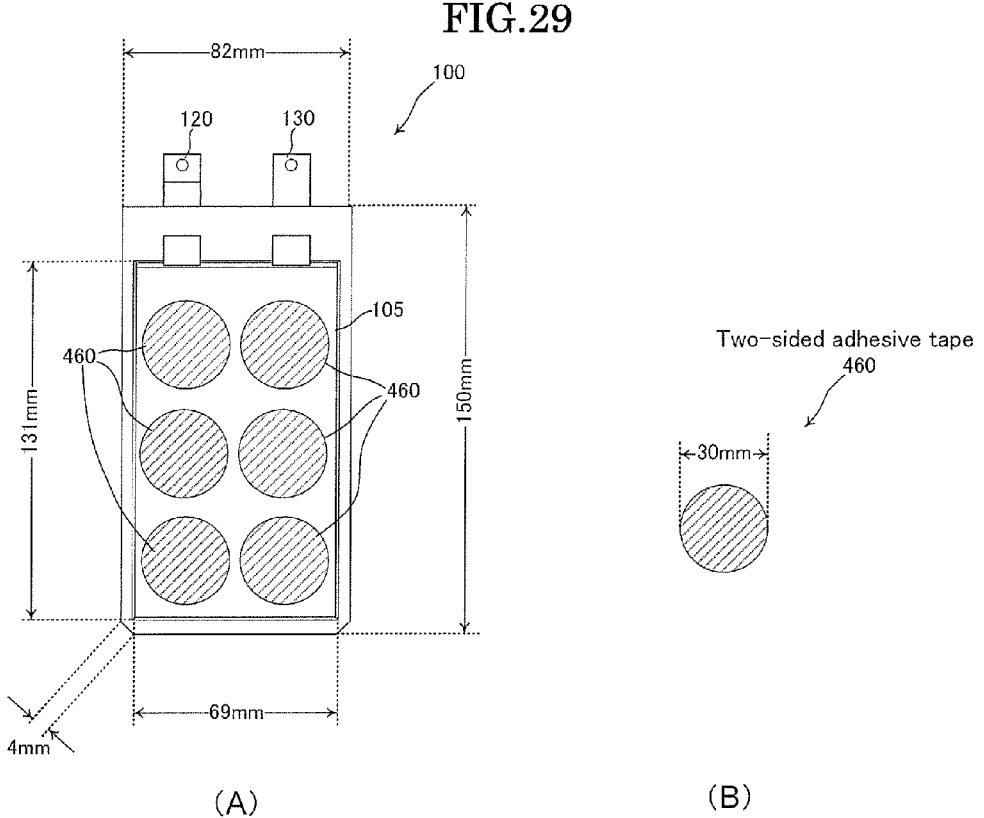
FIGS. 29A and 29B are diagrams illustrating another example of conditions for bonding unit batteries 100 together.

In the example shown in FIGS. 29A and 29B, in a process of making the battery pack, the two-sided adhesive tape 460, which is used to bond the unit batteries 100 together, is circular in shape with a diameter of 30 mm, and the outer circumference thereof is about 94.2 mm in length. In the example shown in FIGS. 29A and 29B, the number of such circular two-sided adhesive tapes 460 used is six. Therefore, the total outer circumference of the two-sided adhesive tapes 460 used for bonding batteries together is 565.2 mm, and can be set longer than the outer circumference of the electrode laminated area 105, which is 400 mm in length. In this manner, even under the bonding conditions shown in FIG. 29, it is possible to achieve similar advantageous effects to those in the above-described embodiment.

The following describes preferred bond strength at a time when the unit batteries 100 are bonded together with the two-sided adhesive tapes 460. Even in the following description, the relationships of dimensions shown in FIGS. 27A and 27B are used.

The adhesive power of the two-sided tape 460 used in the present embodiment is 0.98 N/mm. Therefore, when two strips of two-sided adhesive tape 460, whose long sides are 100 mm in length and whose short sides are 12 mm in length, are used, the bond strengths (tensile strengths) for bonding unit batteries 100 together in the long-side and short-side directions are as follows.

Long-side direction: 0.98 (N/mm)×12 (mm)×2 (strips)=24N
Short-side direction: 0.98 (N/mm)×100 (mm)×2 (strips)=98N Meanwhile, the adhesive power of a fusion-bonding portion of the laminate film casing material of the unit battery 100 is 1.5 N/mm. Incidentally, in the unit battery 100 shown in FIG. 27, the narrowest fusion-bonding portion is 5 mm in width. Given the above, the minimum bond strengths of the fusion-bonding portion of the laminate film casing material of the unit battery 100 in the long-side and short-side directions are as follows.

Long-side direction: 1.5 (N/mm)×5 (mm)×2 (sides)=15N
Short-side direction: 1.5 (N/mm)×5 (mm)×2 (strips)=15N The maximum bond strengths of the fusion-bonding portion of the laminate film casing material of the unit battery 100 in the long-side and short-side directions are as follows.

Long-side direction: 1.5 (N/mm)×82 (mm)=123N
Short-side direction: 1.5 (N/mm)×150 (mm)=225N According to the present embodiment, the bond strength for bonding the unit batteries 100 together using the two-sided adhesive tapes 460 is set larger than the minimum bond strength of the fusion-bonding portion. Accordingly, when the battery pack is disassembled and the unit batteries 100 are taken out, the fusion-bonding portion of a unit battery 100 is ripped up. As a result, the unit battery 100 becomes unavailable, thereby averting the risk that the unit battery 100 taken out will be reused.

In this case, the positive-electrode pulled-out tab 120 of the first unit battery 100 attached to the holder member 200 is disposed in the first row 211, and the negative-electrode pulled-out tab 130 in the second row 212. On the other hand, the positive-electrode pulled-out tab 120 of the second unit battery 100 attached to the holder member 200 is disposed in the second row 212, and the negative-electrode pulled-out tab 130 in the first row 211. Hereinafter, in a process of sequentially placing unit batteries 100, the positive-electrode pulled-out tabs 120 of the odd unit batteries 100 attached are disposed in the first row 211, and the negative-electrode pulled-out tabs 130 in the second row 212. The positive-electrode pulled-out tabs 120 of the even unit batteries 100 attached are disposed in the second row 212, and the negative-electrode pulled-out tabs 130 in the first row 211. In this manner, in the direction in which the unit batteries 100 are stacked, the unit batteries 100 are so disposed that the pulled-out tabs of the adjacent unit batteries 100 face different directions. Accordingly, on the board 300, connection does not have to take place diagonally with respect to the stacking direction.

After it is confirmed that the first end portion 111 of the second unit battery 100 is pushed into until the first end portion 111 hits the first surface 210 of the holder member 200, a subsequent task starts on the board 300.

Figure 13:
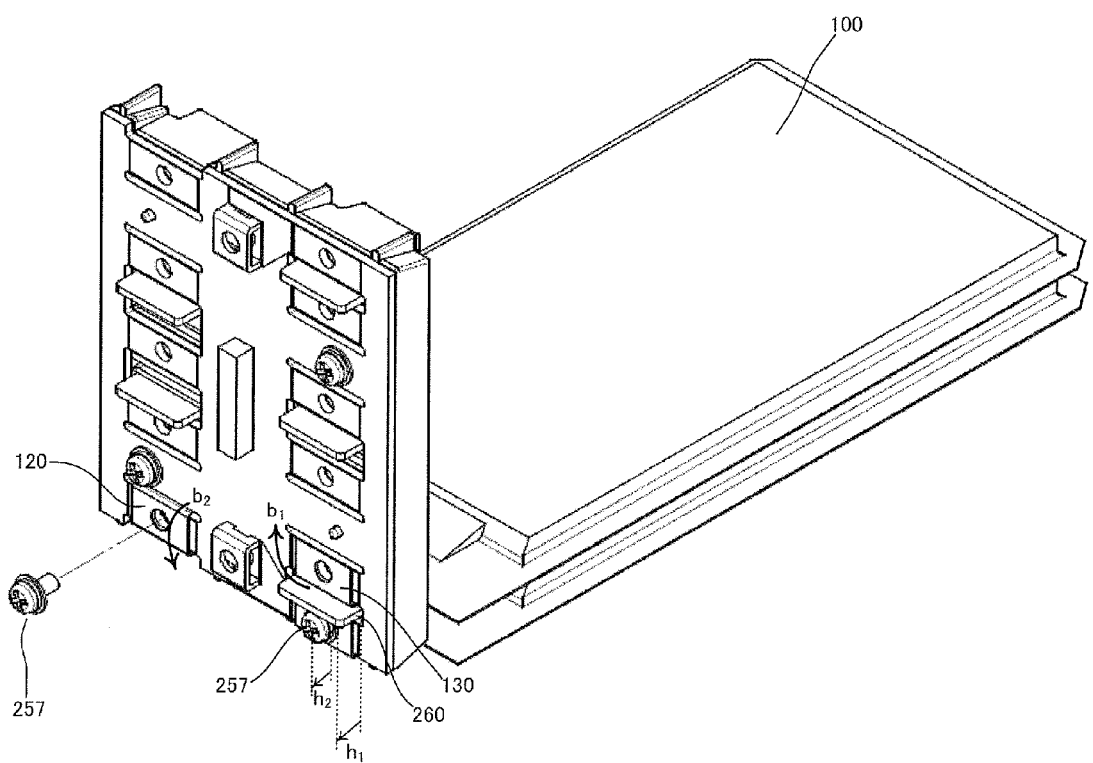
FIG. 13 is a diagram illustrating a process of producing the battery connecting structure 500, which makes up the battery pack according to the embodiment of the present invention.

In a subsequent process shown in FIG. 13, the positive-electrode pulled-out tab 120 of the second unit battery 100 attached is bent downward as shown in the diagram, and is put on the negative pulled-out electrode 130 of the first unit battery 100 attached. After that, a pulled-out tab connection bolt 257 is inserted into a hole of each pulled-out tab, or a pulled-out tab connection screw hole 325, and is screwed into a nut 256, forming a connection portion for the negative-electrode pulled-out tab 130 of the first unit battery 100 attached on the thin-film electrode section 320b and the positive-electrode pulled-out tab 120 of the second unit battery 100 attached. In this manner, an electrical connection is completed.

Meanwhile, the negative-electrode pulled-out tab 130 of the second unit battery 100 attached is bent upward as shown in the diagram, thereby making preparations for the positive-electrode pulled-out tab 120 of the third unit battery 100 attached to be connected.

Figure 14:
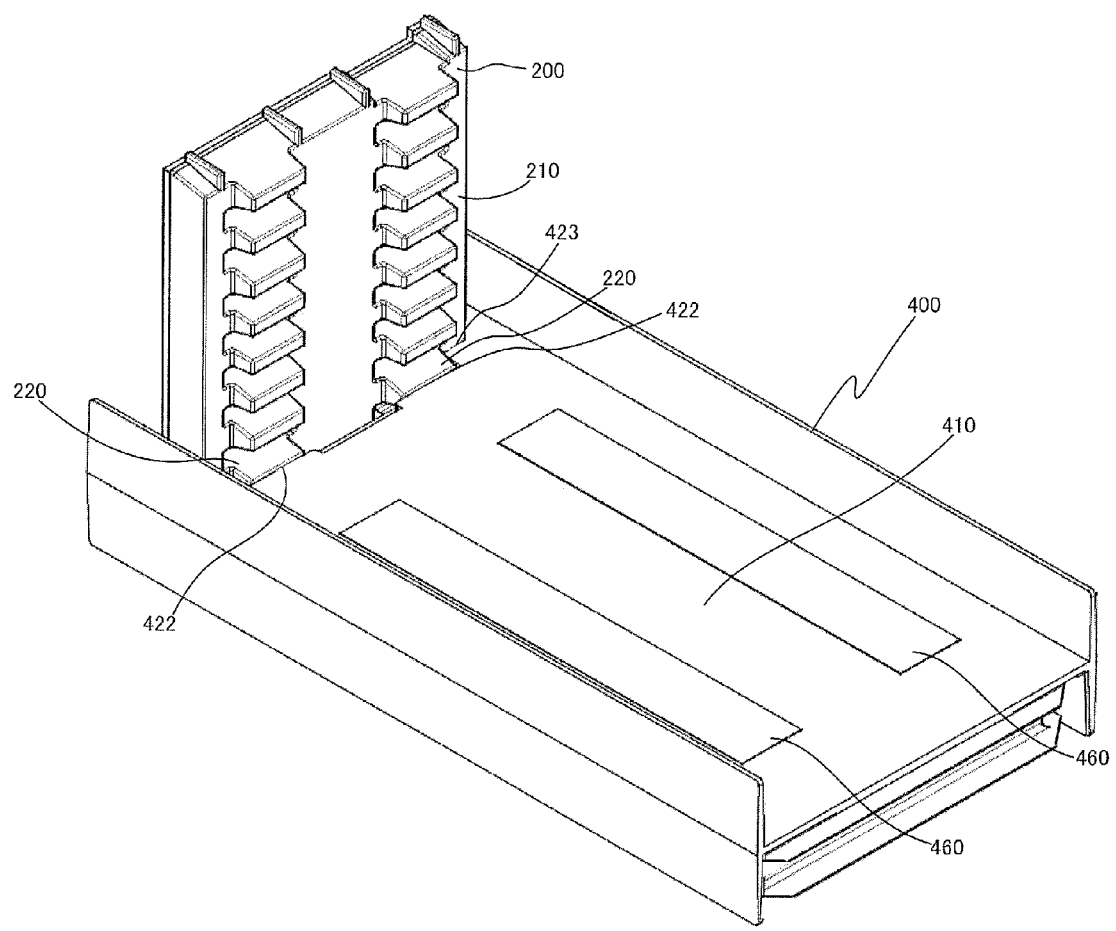
FIG. 14 is a diagram illustrating a process of producing the battery connecting structure 500, which makes up the battery pack according to the embodiment of the present invention.

In a subsequent process shown in FIG. 14, in a similar way to the case where the second unit battery 100 is attached, a battery protective member 400 is attached with the use of a spacer. The upper surface of the second unit battery 100 and the lower surface of the battery protective member 400 are bonded together with two strips of two-sided adhesive tape 460. Furthermore, as shown in the diagram, two strips of two-sided adhesive tape 460 are attached to the upper surface of the battery protective member 400. With the use of the two-sided adhesive tapes 460, the battery protective member 400 is fixed to the third unit battery 100 attached to the holder member 200.

The battery protective member 400 is attached to the unit battery 100 in such a way that there is a space of about 2 mm between the second notch sections 422 or third notch sections 423 and the holder member 200. The space makes it difficult for the vibrations or shocks delivered to the battery pack to spread to the positive-electrode pulled-out tab 120 and the negative-electrode pulled-out tab 130, thereby improving the reliability of electric connection of the battery pack.

Incidentally, if the vibrations or shocks delivered to the battery pack are expected to be small, the space may not be provided. In this case, the battery protective member 400 can be attached to the unit battery 100 after the battery protective member 400 is pushed into until the second notch sections 422 or third notch sections 423 hit the holder member 200. Since the battery protective member 400 is attached to the unit battery 100 as described above, it is easy to position the battery protective member 400 in the stacking direction.

Figure 15:
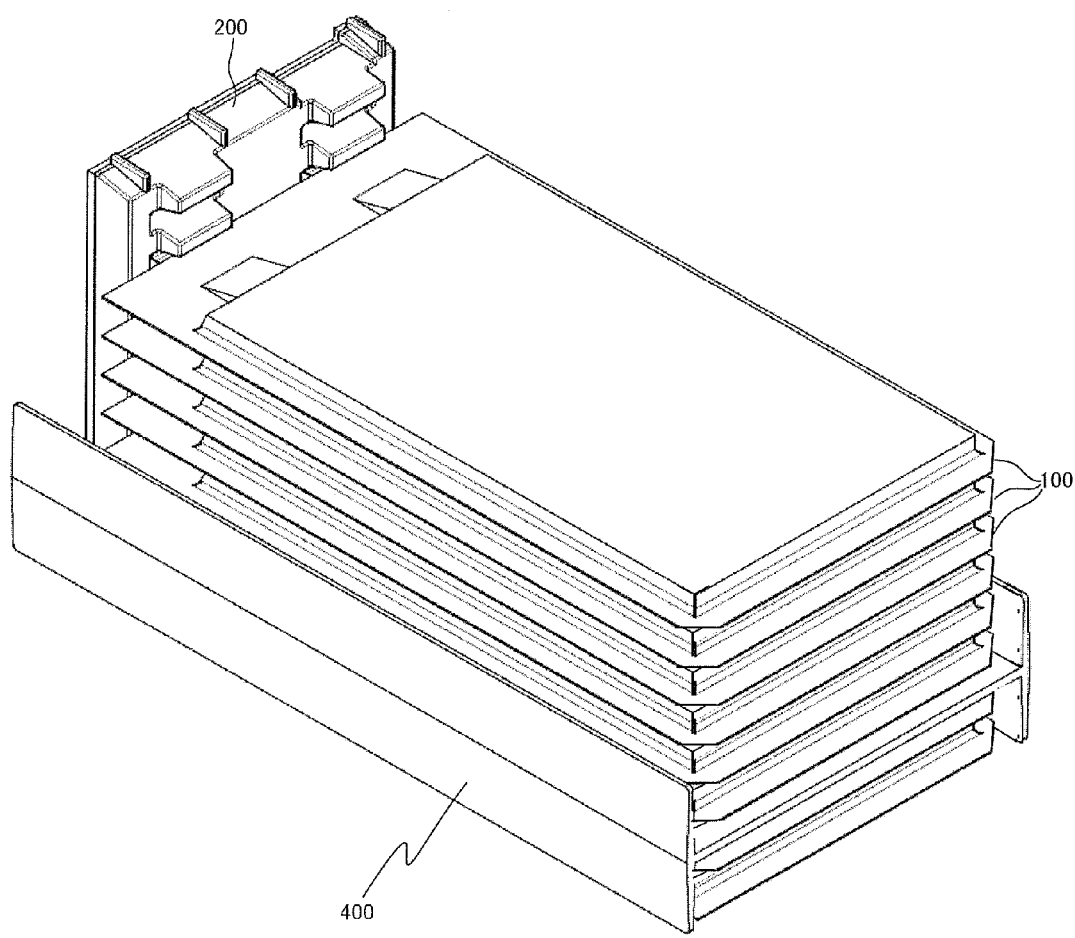
FIG. 15 is a diagram illustrating a process of producing the battery connecting structure 500, which makes up the battery pack according to the embodiment of the present invention.

FIG. 15 shows the situation where the third to eighth unit batteries 100 are sequentially attached to the holder member 200 and the board 300 in a similar way to that described above. On the board 300, each time one unit battery 100 is attached, the pulled-out tabs are bent and put on each other, and the pulled-out tabs of the adjacent unit batteries 100 are connected by means of the pulled-out tab connection bolts 257. In this manner, an electrical connection is realized.

Figure 16:
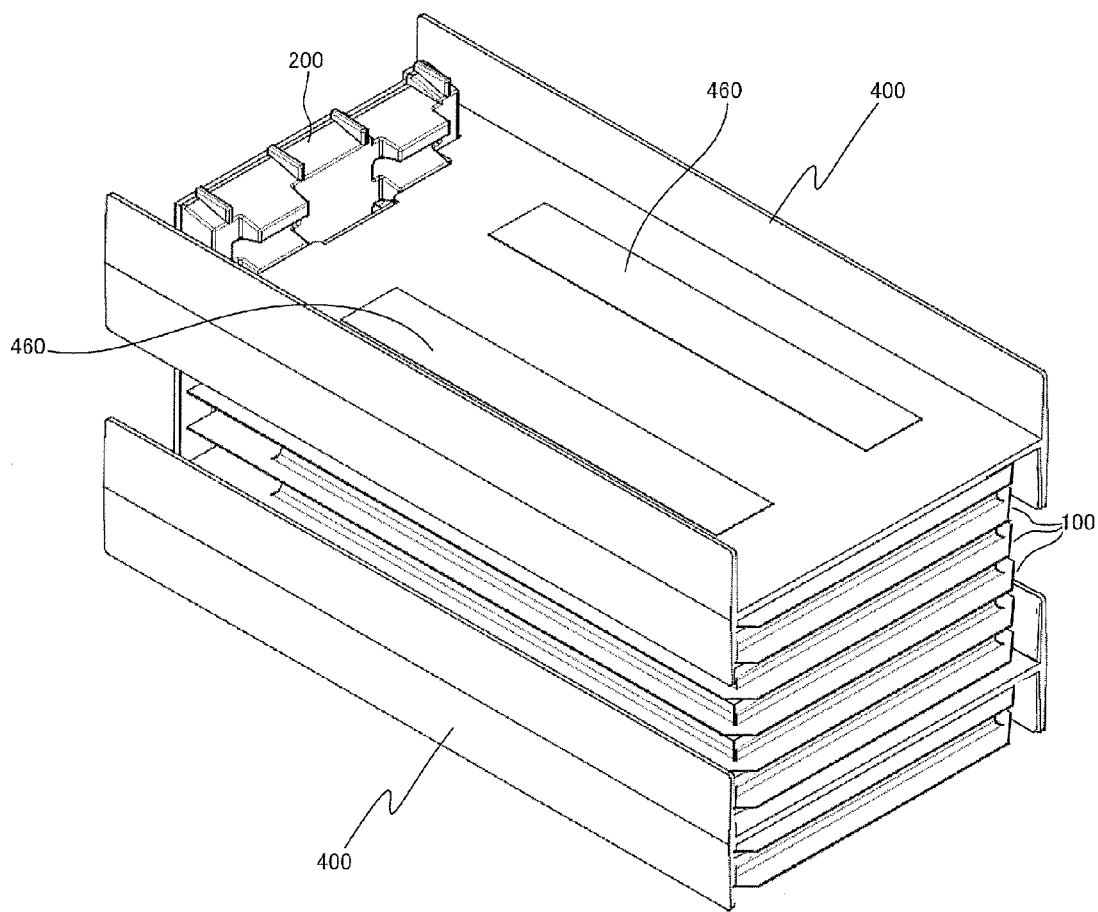
FIG. 16 is a diagram illustrating a process of producing the battery connecting structure 500, which makes up the battery pack according to the embodiment of the present invention.

In a subsequent process shown in FIG. 16, what is shown is the situation where, after the eighth unit battery 100 is attached, still another battery protective member 400 is attached. In this manner, in the battery connecting structure 500 of the present embodiment, two battery protective members 400 are disposed. In this manner, each unit battery 100 is protected against external shocks and the like.

Figure 17:
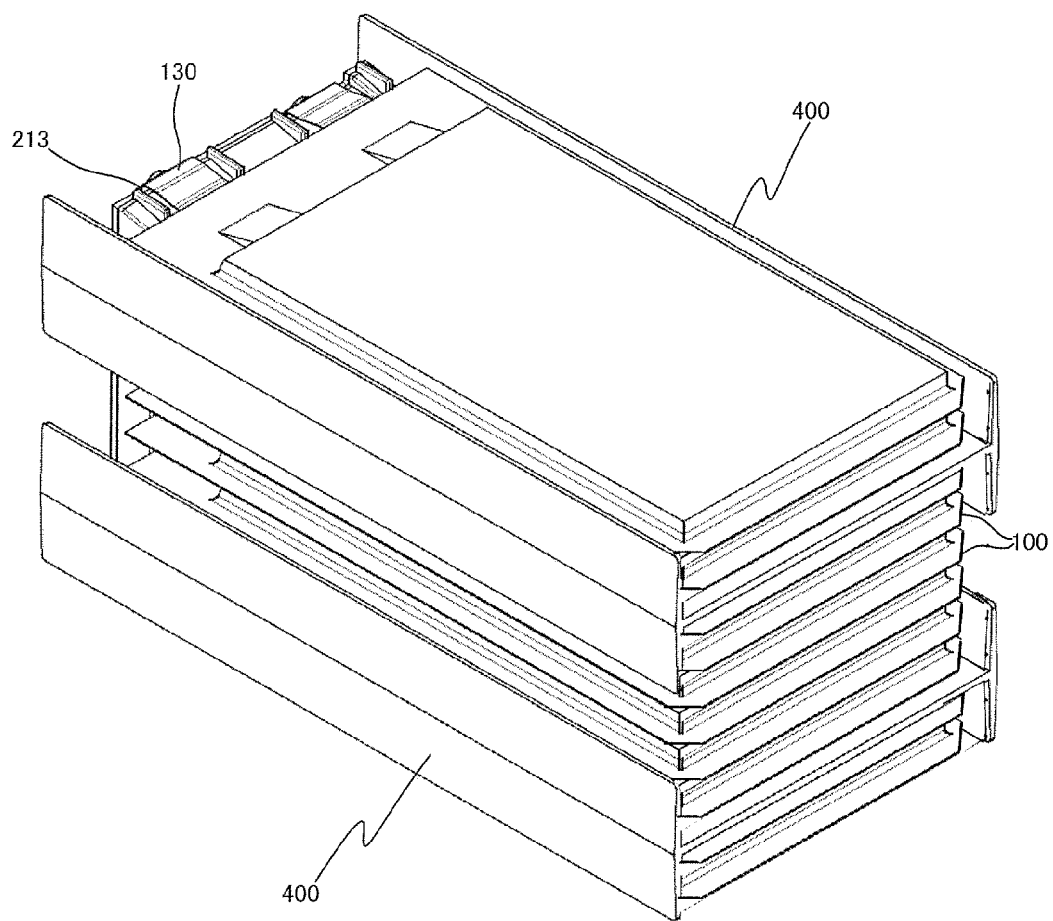
FIG. 17 is a diagram illustrating a process of producing the battery connecting structure 500, which makes up the battery pack according to the embodiment of the present invention.

FIG. 17 shows the situation where, on the battery protective member 400, the ninth and tenth unit batteries 100 are further attached to the holder member 200 and the board 300. The negative-electrode pulled-out tab 130 of the tenth unit battery 100 is bent so as to come in contact with the thin-film electrode section 320c of the board 300 with the use of the pulled-out tab guidance section 213, and is fixed to the thin-film electrode section 320c with the use of the pulled-out tab connection bolt 257. As a result, the pulled-out tabs of the first to tenth unit batteries 100 are each connected on the board 300, and a process of connecting ten unit batteries 100 in series is completed. A process of charging and discharging the ten unit batteries 100 connected in series can be performed through the positive electrode washer 321 and the negative electrode washer 322. A terminal member 331 is attached to the positive electrode washer 321, and a terminal member 332 to the negative electrode washer 322. In this manner, the battery connecting structure 500 is completed.

As described above, the battery pack of the present invention is made in the following manner: the positive-electrode and negative-electrode pulled-out tabs of a plurality of unit batteries 100 are inserted into the pulled-out tab insertion holes 215 of the holder member 200, and the pulled-out tabs having different polarities of a plurality of the unit batteries 100 are connected together on the board 300. Therefore, the production of battery packs is highly efficient, resulting in an improvement in productivity.

Moreover, the pulled-out tabs having different polarities of a plurality of the unit batteries 100 are connected together on the board 300 with pulled-out tab connection bolts 257 and nuts 256. Therefore, it is easy to connect a plurality of unit batteries 100 electrically. Thus, the production of battery packs is highly efficient, resulting in an improvement in productivity.

A feature of each connection section of the battery connecting structure 500, which is formed as described above, will be detailed.

On the board 300, three kinds of thin-film electrode section are provided: thin-film electrode sections 320a, 320b and 320c.

Among the above thin-film electrode sections, the thin-film electrode section 320a is used to electrically connect the following components: the positive electrode washer 321, which is provided on one end portion of the board 300, and the positive-electrode pulled-out tab 120 of a unit battery 100, which is attached to one end portion of the board 300. That is, a connection section in the thin-film electrode section 320a functions as a positive-electrode pulled-out tab/positive electrode washer connection section.

As for the unit battery 100 that is attached to one end portion of the board 300, as indicated by a bending direction $b_1$ and the like in FIG. 10, the positive-electrode pulled-out tab 120 and negative-electrode pulled-out tab 130 thereof are both bent in the same direction.

The thin-film electrode section 320c is used to electrically connect the following components: the negative electrode washer 322, which is provided on the other end portion that is different from one end portion of the board 300, and the negative-electrode pulled-out tab 130 of a unit battery 100, which is attached to the other end portion of the board 300. That is, a connection section in the thin-film electrode section 320c functions as a negative-electrode pulled-out tab/negative electrode washer connection section.

Figure 18:
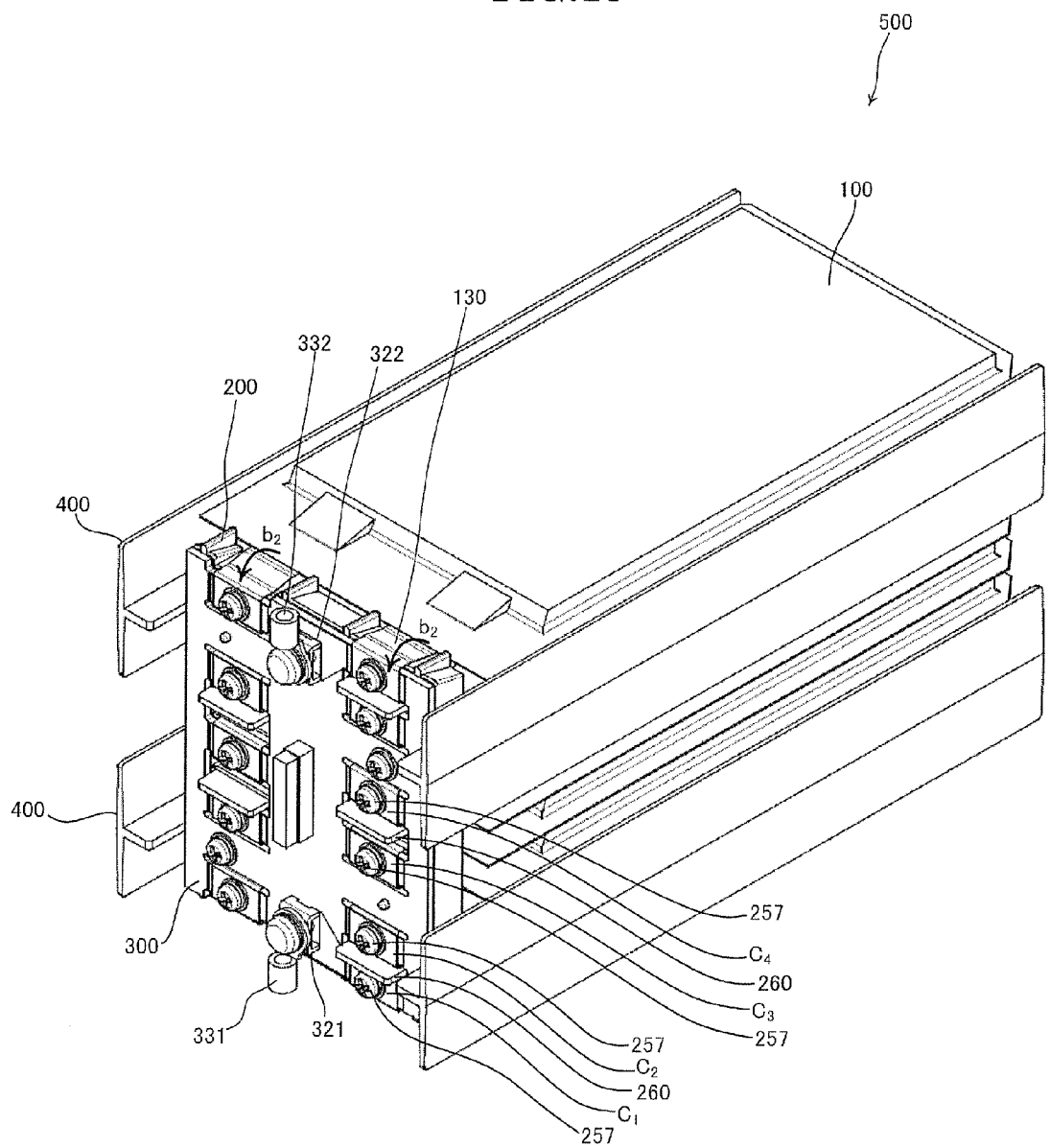
FIG. 18 is a diagram illustrating a process of producing the battery connecting structure 500, which makes up the battery pack according to the embodiment of the present invention.

Even as for the unit battery 100 that is attached to the other end portion of the board 300, as indicated by a bending direction $b_2$ and the like in FIG. 18, the positive-electrode pulled-out tab 120 and negative-electrode pulled-out tab 130 thereof are both bent in the same direction.

The thin-film electrode section 320b is used to electrically connect the following components: the positive-electrode pulled-out tab 120 of one unit battery 100, which is not attached to both end portions of the board 300, and the negative-electrode pulled-out tab 130 of the other unit battery 100. That is, a connection section in the thin-film electrode section 320b functions as a pulled-out tab connection section for connecting together the pulled-out tabs having different polarities of a plurality of unit batteries 100.

As for the unit battery 100 that is not attached to both end portions of the board 300 but relies on the above pulled-out tab connection section for the pulled-out tabs to be connected, as indicated by the bending directions $b_1$, $b_2$ and the like in FIG. 13, the positive-electrode pulled-out tab 120 and the negative-electrode pulled-out tab 130 are bent in opposite directions.

The following describes a feature of the divider piece 260 on the battery connecting structure 500, which is formed as described above. For example, as shown in FIG. 13, in a connection section for the pulled-out tabs (120, 130), the height $h_1$ of the divider piece 260 from the board 300 is designed so as to be higher than the height $h_2$ of the pulled-out tab connection bolt 257, which is used to connect the pulled-out tabs (120, 130). The above dimensional relationship is satisfied not only in the area shown in FIG. 13, but also for the height of all the divider pieces 260 and the height of pulled-out tab connection bolts 257 in all the connection sections.

Since the above configuration is employed, for example, even when a conductive member approaches the board 300 of the battery connecting structure 500, the divider pieces 260 serve as shields. Therefore, the conductive member does not cause the pulled-out tab connection bolts 257 of the adjacent connection sections to be short-circuited (For example, the pulled-out tab connection bolt 257 of a connection section $C_1$ shown in FIG. 18 and the pulled-out tab connection bolt 257 of a connection section $C_2$ are not short-circuited; or alternatively, the pulled-out tab connection bolt 257 of a connection section $C_3$ and the pulled-out tab connection bolt 257 of a connection section $C_4$ are not short-circuited).

In addition to the above advantageous effects, there are the following advantageous effects. In a process of producing the battery connecting structure 500, the pulled-out tabs (120, 130) of a unit battery 100 are inserted into the pulled-out tab insertion holes 215 before being attached. Then, on the board 300, the pulled-out tabs (120, 130) are bent. In this case, since there is the divider piece 260, the following production mistake is not made: the pulled-out tabs (120, 130) are bent in a direction opposite to an original direction in which the pulled-out tabs should be bent. Moreover, even if the pulled-out tabs (120, 130) are bent in the direction opposite to the original direction, the tabs do not go beyond the divider piece 260 to reach a connection section that is not the original connection section, because the length of the pulled-out tabs (120, 130) and the height of the divider piece 260 are so set as to avoid an unwanted electrical connection.

The following describes processes of making a battery pack of the present invention using the battery connecting structure 500, which is formed as described above, with reference to FIGS. 19 to 26.

Figure 19:
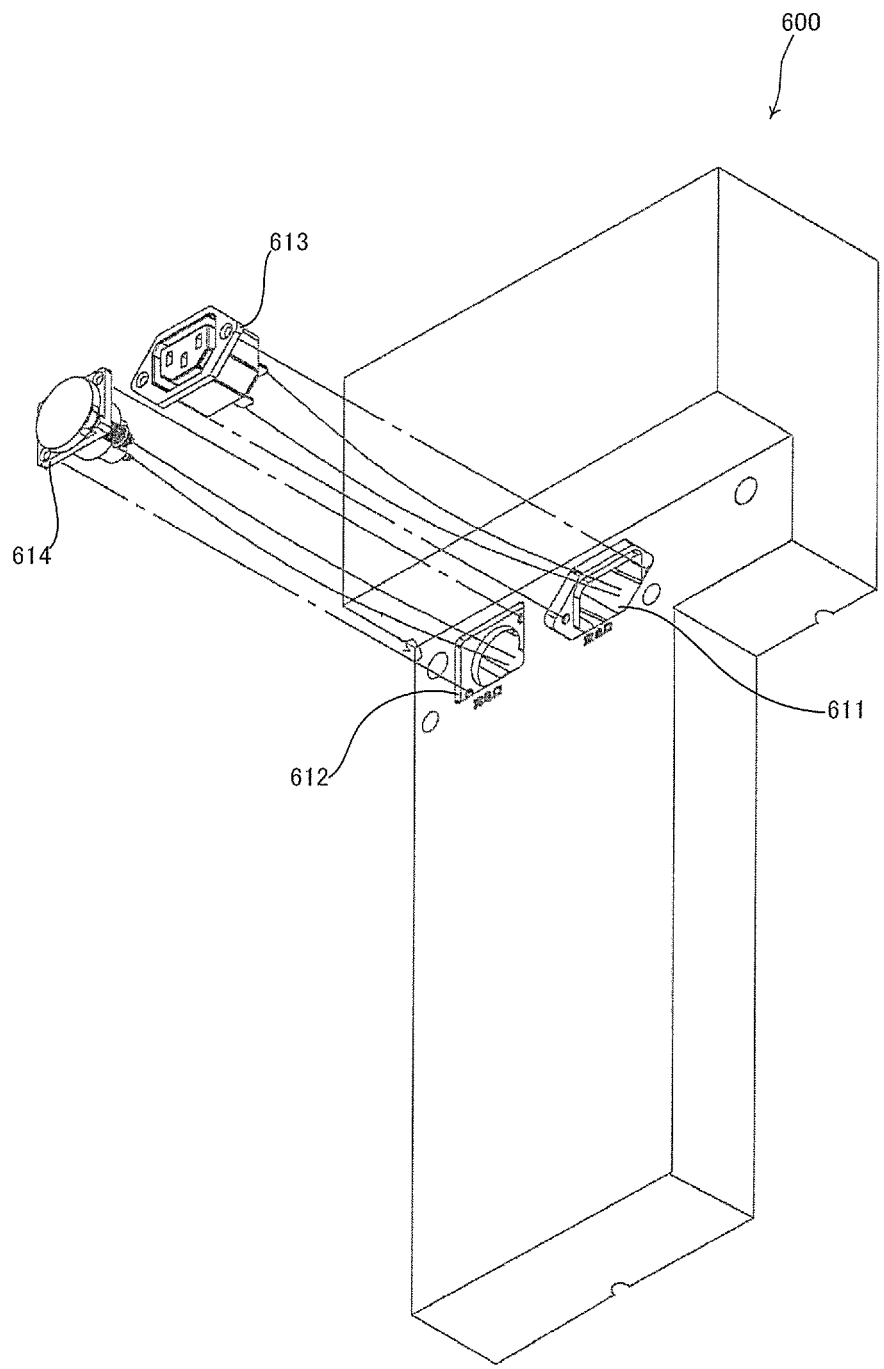
FIG. 19 is a diagram illustrating a process of producing the battery pack according to the embodiment of the present invention.

In a process shown in FIG. 19, to a first case body 600 that houses the battery connecting structure 500, a discharge terminal 613 and a charge terminal 614 are fixed with screws with the help of a discharge terminal attachment concave section 611 and a charge terminal attachment concave section 612, which are provided on the first case body 600.

Figure 20:
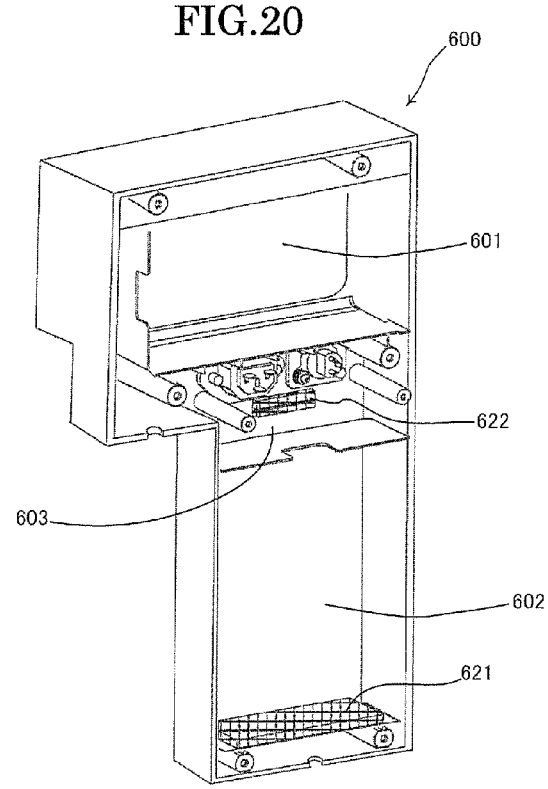
FIG. 20 is a diagram illustrating a process of producing the battery pack according to the embodiment of the present invention.

In a process shown in FIG. 20, a first cushioning member 621 is attached to a second housing section 602 of the first case body 600 with an adhesive or the like, and a second cushioning member 622 to a circuit housing section 603.

Figure 21:
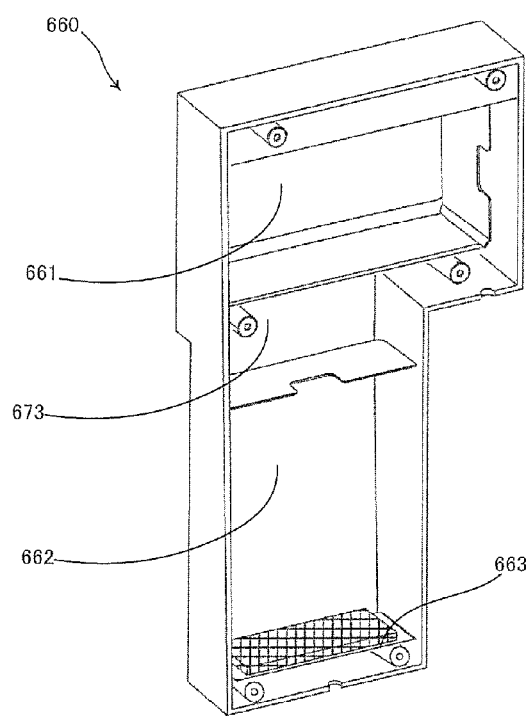
FIG. 21 is a diagram illustrating a process of producing the battery pack according to the embodiment of the present invention.

In a process shown in FIG. 21, to a second housing section 662 of a second case body 660, a third cushioning member 663 is attached with an adhesive or the like.

Figure 22:
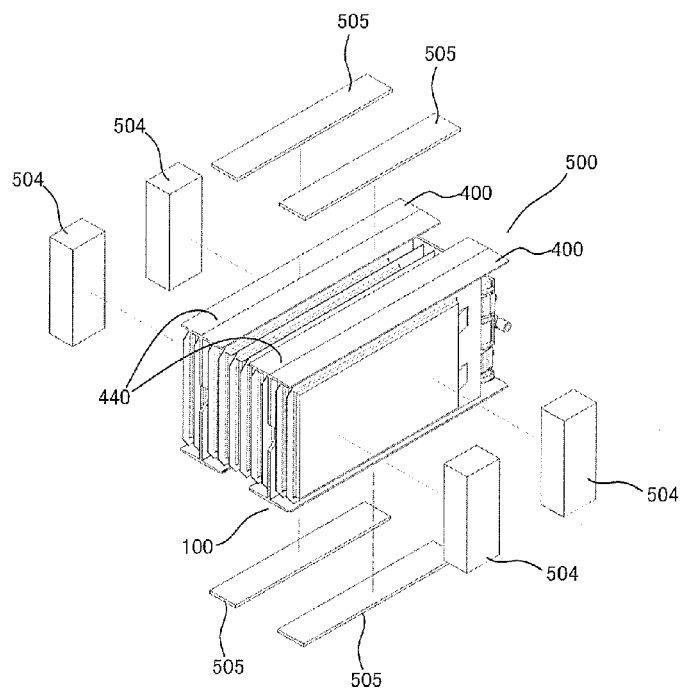
FIG. 22 is a diagram illustrating a process of producing the battery pack according to the embodiment of the present invention.
Figure 23:
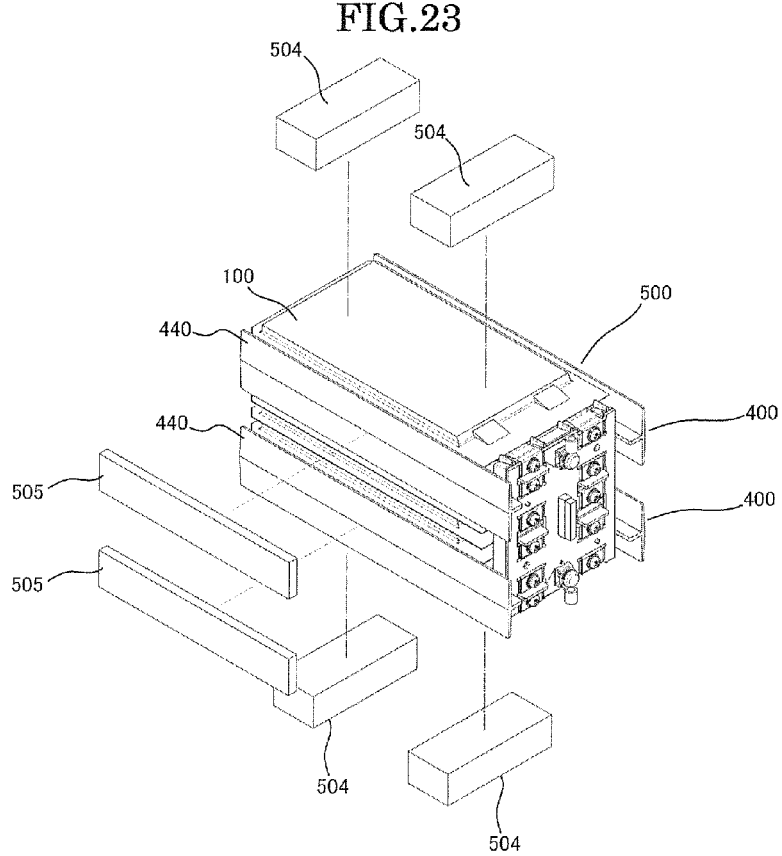
FIG. 23 is a diagram illustrating a process of producing the battery pack according to the embodiment of the present invention.

In processes shown in FIGS. 22 and 23, to the battery connecting structure 500, cushioning materials are attached. In the battery pack of the present invention, two structures, i.e. a first battery connecting structure 500 and a second battery connecting structure 500, are stored in the battery pack. The first battery connecting structure 500 and the second battery connecting structure 500 are connected in parallel before being used.

In a process shown in FIG. 22, as for the first battery connecting structure 500, fourth cushioning members 504, which are thick, are attached to an edge-portion unit battery 100; to all protective-side plate sections, fifth cushioning members 505, which are thinner than the fourth cushioning members 504, are attached. An adhesive or the like is used in attaching the fourth cushioning members 504 and the fifth cushioning members 505 to parts. In this case, a thermistor 530 (not shown in FIG. 22), which is temperature detection means in the battery pack, is attached only to the first battery connecting structure 500. The thermistor 530 detects a temperature of the first battery connecting structure 500 and transmits a detection signal thereof to a protective circuit board 700.

Meanwhile, in a process shown in FIG. 23, as for the second battery connecting structure 500, fourth cushioning members 504 are attached to an edge-portion unit batter 100; only to a one-side protective-side plate section, fifth cushioning members 505 are attached. As in the case described above, an adhesive or the like is used in attaching the fourth cushioning members 504 and the fifth cushioning members 505 to parts.

Figure 24:
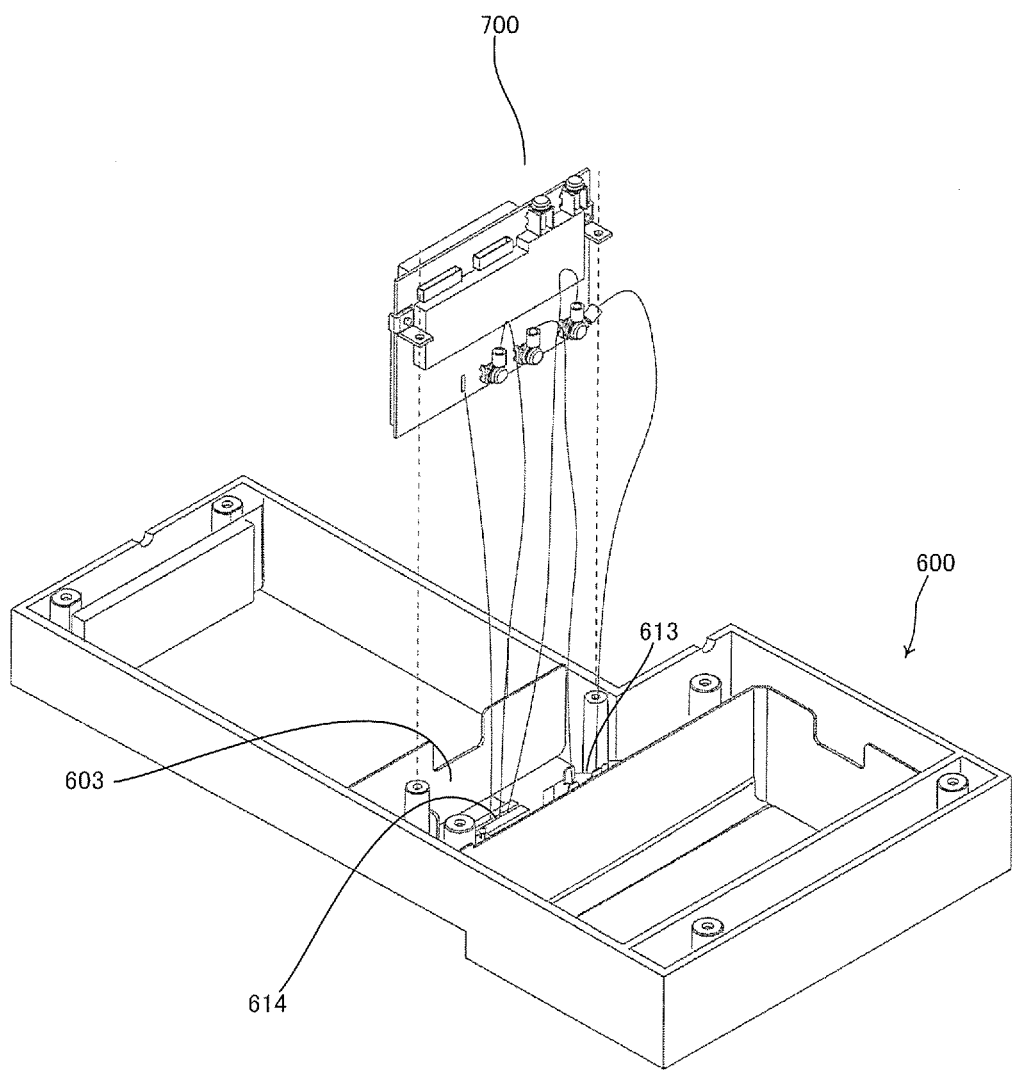
FIG. 24 is a diagram illustrating a process of producing the battery pack according to the embodiment of the present invention.

In a process shown in FIG. 24, a discharge terminal 613, a charge terminal 614, a thermistor 530 and a protective circuit board 700 are connected with wires. Moreover, the protective circuit board 700 is fixed to the circuit housing section 603 of the first case body 600 with screws.

Figure 25:
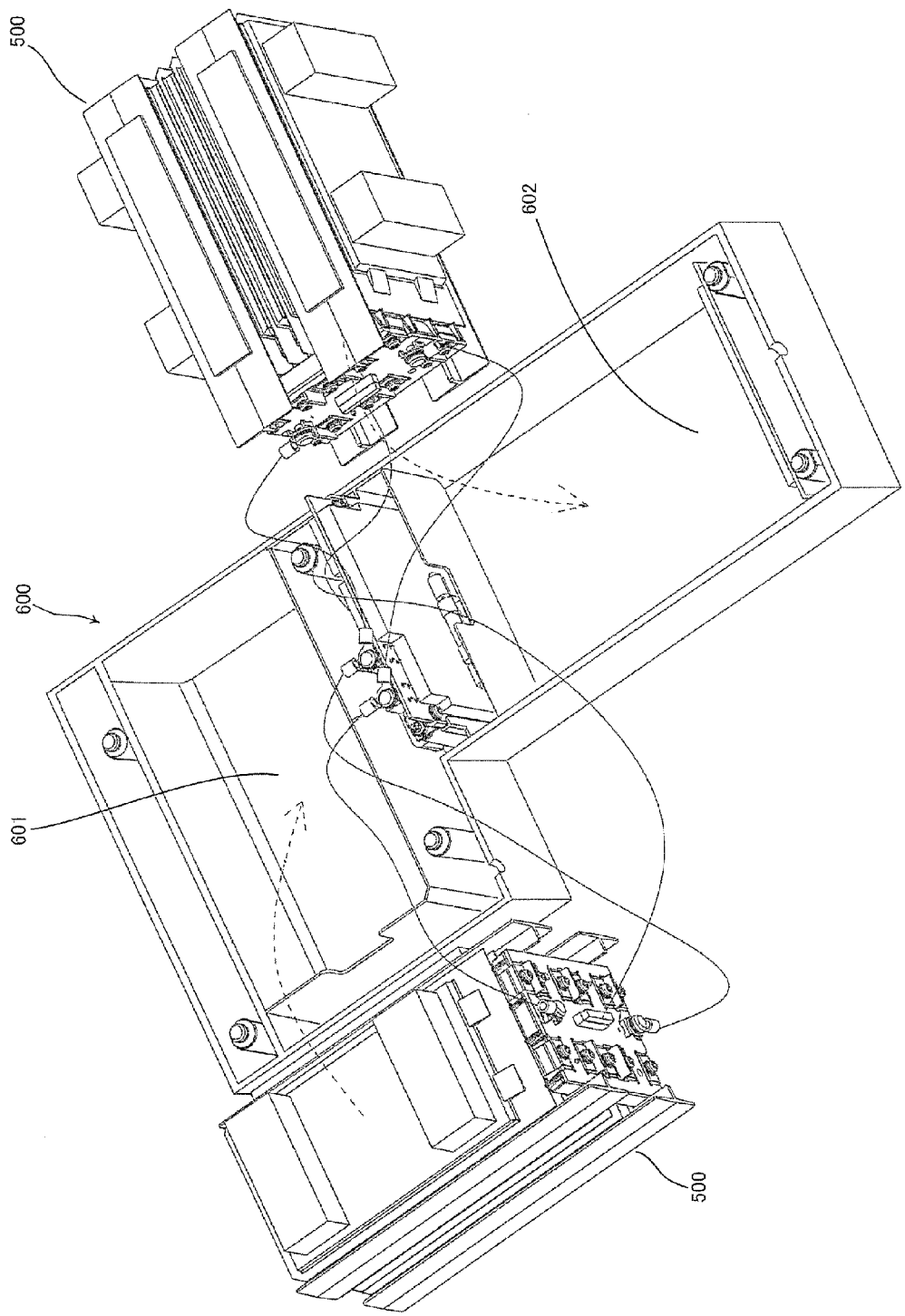
FIG. 25 is a diagram illustrating a process of producing the battery pack according to the embodiment of the present invention.

In a process shown in FIG. 25, the first and second battery connecting structures 500 are connected to the protective circuit board 700 with wires. Moreover, the first battery connecting structure 500 is stored in the first housing section 601 of the first case body 600, and the second battery connecting structure 500 in the second housing section 602.

Figure 26:
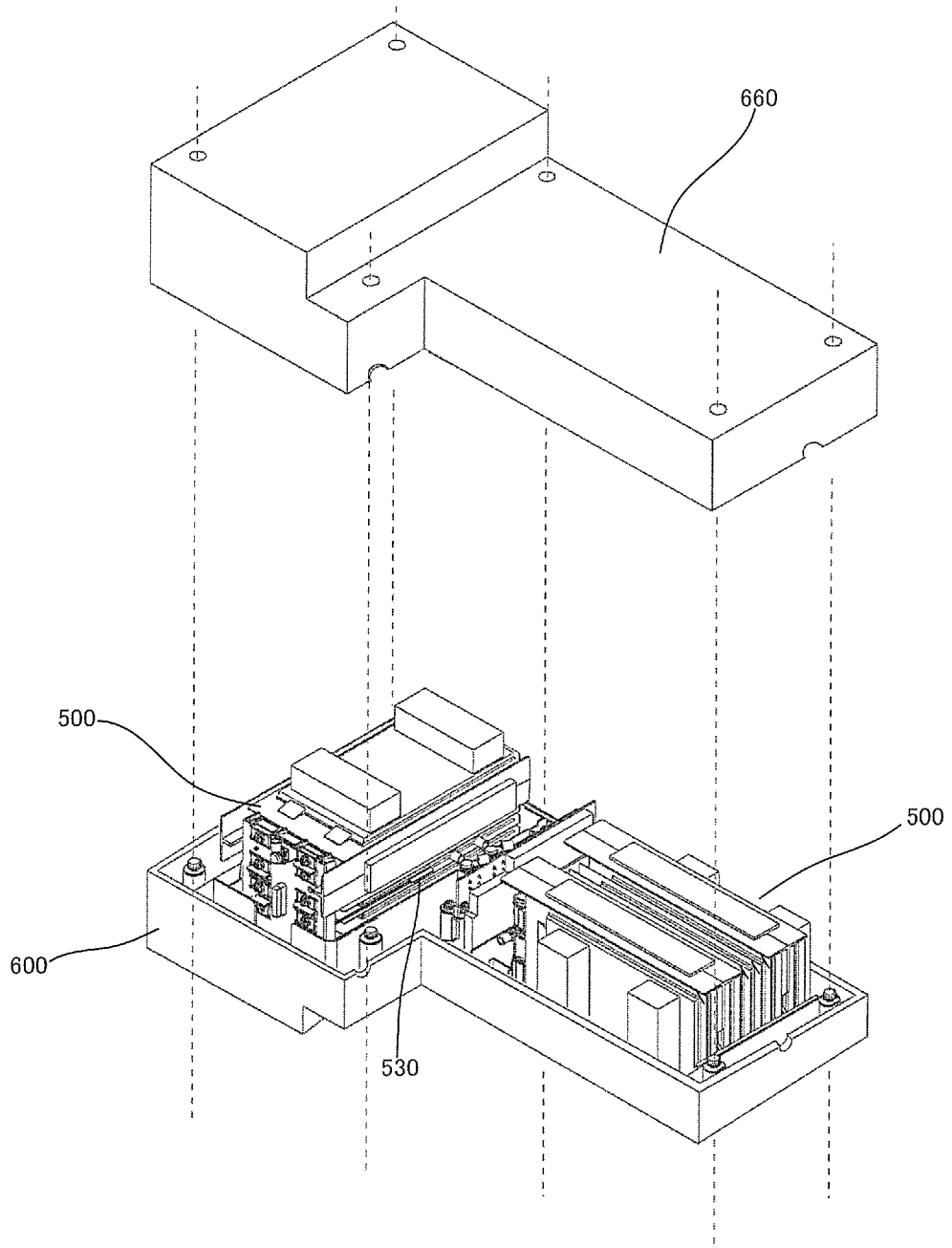
FIG. 26 is a diagram illustrating a process of producing the battery pack according to the embodiment of the present invention.

In a process shown in FIG. 26, the first case body 600 is fixed to the second case body 660 with screws. As a result, a battery pack 800 of the present invention is completed.

Here, the temperature detection means in the battery pack 800 of the present invention will be described. As described above, the battery pack 800 of the present invention is formed in such a way that two battery connecting structures 500 are stored in the same case bodies 600 and 660. However, as shown in FIG. 26, among the two battery connecting structures 500, the thermistor 530 is provided, or attached, only on the first battery connecting structure 500 that is housed in the first housing section of the case body. Only temperature data, detected by the thermistor 530, are transmitted to a circuit provided on the protective circuit board 700, and are used to control batteries.

Figure 30:
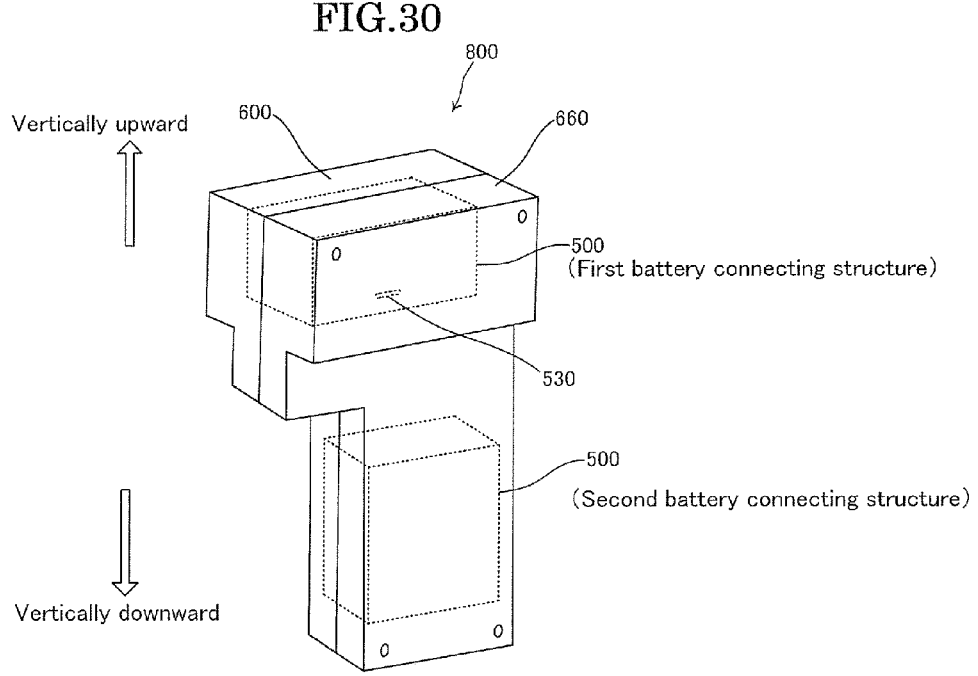
FIG. 30 is a diagram showing how the battery pack is positioned when in use according to the embodiment of the present invention.

The reason the thermistor 530 is provided in the first battery connecting structure 500 among the two battery connecting structures 500 housed in the case bodies is that in the battery pack 800 that is positioned for use, the first battery connecting structure 500 is disposed at a vertically higher position than the second battery connecting structure 500, which is disposed at a lower position, and that the first battery connecting structure 500 is in an environment where temperatures could easily rise. FIG. 30 is a diagram showing how the battery pack 800 of the embodiment of the present invention is positioned when being used as a source of power for a bicycle.

In the battery pack 800 of the present invention, the thermistor 530 is attached to the first battery connecting structure 500, which is disposed in a vertically upper portion of the case body, in which temperatures could easily rise, and is under a thermally unfavorable condition. Temperature data are acquired from the thermistor 530. Based on the temperature data, control processes, such as a process of stopping discharging, take place on the protective circuit board 700. According to the above battery pack 800 of the present invention, it is possible to reduce the number of components and costs, as well as to simplify the configuration of a circuit that processes detection data of the thermistor 530.

Incidentally, according to the present embodiment, among the two battery connecting structures 500 provided in the case bodies, the thermistor 530 is provided in the battery connecting structure 500 that is positioned in a vertically upper portion when being used. However, the present invention can be applied to the case where three or more battery connecting structures 500 are provided in case bodies. That is, if three or more battery connecting structures 500 are stored in case bodies of a battery pack, the thermistor 530 is provided only on the battery connecting structure 500 that is disposed at the vertically highest position when being used.

The following describes the vibration resistance of the battery pack 800, which is formed as described above. The problem is that, if vibrations are continuously applied to the battery pack that is formed in such a way that unit batteries, which use a laminate casing material, are connected in series and stacked, a corner portion of the laminate film casing material of a unit battery could break through the laminate film casing material of an adjacent unit battery, causing the electrolytic solution or the like inside the unit battery to leak and the battery pack to break down. To solve the problem, one conceivable solution is to chamfer all the corner portions of the laminate films of the unit batteries. However, another problem arises that chamfering all the corner portions requires more production processes, resulting in a rise in production costs.

According to the present invention, while keeping the number of corner portions to be chamfered at a minimum level, it is possible to increase reliability in terms of vibration resistance. The configuration to achieve the above will be described below with reference to FIG. 1 again.

The electrode laminated body, which includes the sheet positive electrodes, sheet negative electrodes and separators, and an electrolytic solution are stored in the laminate film casing material, the periphery of which is then heat-sealed. As a result, the inside of the battery main unit 110 is hermetically closed. From the first end portion 111 on the periphery, the positive-electrode pulled-out tab 120 and the negative-electrode pulled-out tab 130 are taken out.

The following looks at the dimensional relationships of fusion-bonding portions formed by heat-sealing on the laminate film casing material. A fusion-bonding portion that is formed in the first end portion 111 and indicated by c is defined as a first fusion-bonding portion 117; a fusion-bonding portion that is formed in the second end portion 112 and indicated by d is defined as a second fusion-bonding portion 118. The fusion-bonding portions are both shaded in the diagram. The fusion-welding lengths of the first fusion-bonding portion 117 and second fusion-bonding portion 118 are both defined as lengths in a direction in which tabs are taken out.

In the unit battery 100 used in the present embodiment, compared with the first fusion-welding length c of the first fusion-bonding portion 117, the second fusion-welding length d of the second fusion-bonding portion 118 is set shorter. When the stacked unit batteries 100 are used, if a corner portion of the laminate film casing material of an adjacent unit battery 100 comes in contact with the first fusion-bonding portion 117 and rubs against the first fusion-bonding portion 117, the possibility is very low that the first fusion-bonding portion 117 would break. By contrast, if a corner portion of the laminate film casing material of an adjacent unit battery 100 comes in contact with the second fusion-bonding portion 118 and rubs against the second fusion-bonding portion 118, the possibility is relatively high that the second fusion-bonding portion 118 will break.

Therefore, according to the present embodiment, two second-end-side corner portions 116 in the second end portion 112 are chamfered to form chamfered portions 119 at both corner portions. As a result, even if vibrations are applied to the battery pack 800, the second-end-side corner portions 116, on which the chamfered portions 119 are formed, do not affect the second fusion-bonding portion 118 of an adjacent unit battery 100. Therefore, the leakage of electrolytic solution and other troubles do not occur, resulting in an increase in reliability.

On the other hand, in the first end portion 111, even if a first-end-side corner portion 115 of the laminate film casing material of an adjacent unit battery 100 comes in contact with the first fusion-bonding portion 117 and rubs against the first fusion-bonding portion 117 because of vibrations applied to the battery pack 800, the possibility is very low that the first fusion-bonding portion 117 would break. Thus, it is possible to curb an increase in the number of production processes without forming chamfered portions on the two first-end-side corner portions 115 of the first end portion 111.

The following describes a preferred dimensional relationship between the first fusion-welding length c and the second fusion-welding length d in producing the battery pack of the present invention.

The first fusion-welding length c of the unit battery 100 used in the present embodiment is 19±1 mm, and the second fusion-welding length d 6±1 mm. For any fusion-welding length, "±1 mm" means a manufacturing error. The above fusion-welding lengths are determined based on the following grounds.

First, in any fusion-bonding portion of the unit battery 100, it is desirable that the fusion-welding width thereof be greater than or equal to 5 mm in order to ensure the sealing characteristics of the laminate film casing material.

The second fusion-welding length d, which is a fusion-welding width of the second fusion-bonding portion 118, is set longer than required to 6±1 mm given a manufacturing tolerance and the like.

Moreover, when the first fusion-welding length c, which is a fusion-welding width of the first fusion-bonding portion 117, is set to about 18 mm or more and when the battery pack is formed, the possibility is very low that the first fusion-bonding portion 117 would break even if the first-end-side corner portions 115 of adjacent unit batteries 100 rub against each other. Therefore, it is possible to increase the reliability of the battery pack. Thus, in the unit battery 100 of the present embodiment, the first fusion-welding length c is set longer than required to 19±1 mm given a manufacturing tolerance and the like.

Given the above, in order to set the dimensional relationship between the first fusion-welding length c and the second fusion-welding length d, a c/d value, which is obtained by dividing the first fusion-welding length c by the second fusion-welding length d, is calculated: c/d=(19±1)/(6±1). The c/d value is preferably a predetermined value greater than, or equal to, a value that is obtained under the most unfavorable condition. Therefore, it is preferred that c/d≥(19−1)/(6+1)≈2.5. That is, in the battery pack of the present invention, the c/d value, obtained by dividing the first fusion-welding length c by the second fusion-welding length d, is preferably greater than or equal to 2.5.

In the above battery pack 800 of the present invention, there are chamfered portions 119 at both corner portions in the second end portion 112 whose fusion-welding length is short. Therefore, it is possible to curb an increase in the number of production processes when the battery pack 800 is being produced, as well as to prevent the breaking of the laminate films of adjacent unit batteries 100 even when the battery pack 800 is in use and exposed to vibrations. Thus, the leakage of electrolytic solution and other troubles do not occur, resulting in an increase in reliability.

Incidentally, according to the present embodiment, when the two second-end-side corner portions 116 of the second end portion 112 are chamfered, the chamfered portions 119 are formed by cutting the second-end-side corner portions 116 linearly. However, the second-end-side corner portions 116 may be cut in a way that draws an arc, forming the chamfered portions 119 having "R."

Moreover, according to the present embodiment, an example of the unit battery 100 has been described in such a way that fusion-bonding portions are provided on all the four sides of the laminate film casing material. However, the present invention is not limited to the above unit battery 100. The present invention may be applied to a unit battery in which fusion-bonding portions are provided on three sides of the laminate film casing material. Such a unit battery 100 will be described with reference to FIG. 31.

Figure 31:
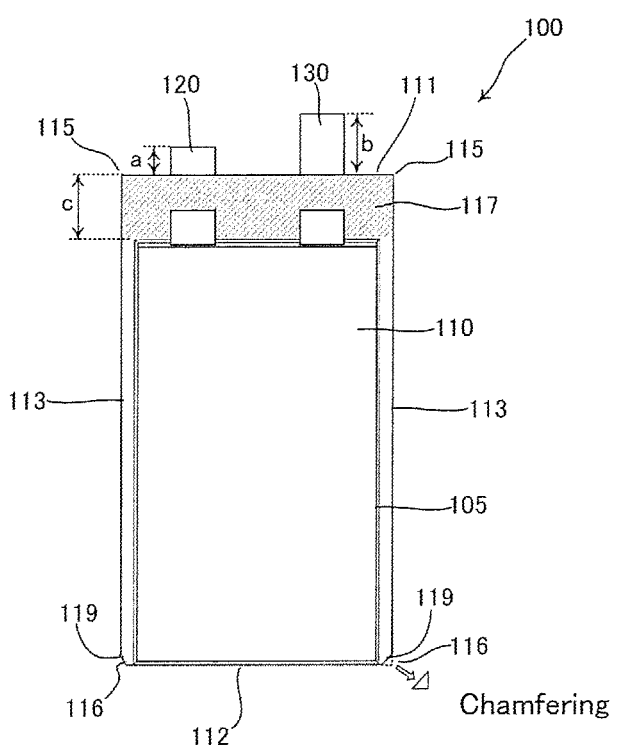
FIG. 31 is a diagram showing another example of a unit battery 100, which makes up a battery pack.

FIG. 31 is a diagram showing another example of a unit battery 100, which makes up the battery pack 800. A battery main unit 110 of the unit battery 100 shown in FIG. 31 has a structure in which the following components are stored in a laminate film casing material: an electrode laminated body, in which a plurality of sheet positive electrodes and a plurality of sheet negative electrodes are stacked via separators, and an electrolytic solution (both not shown). The laminate film casing material is folded back at the second end portion 112, and three sides, i.e. the first end portion 111 and two side end portions 113, are fusion-welded in total. The unit battery 100 is so formed that the electrode laminated body and the electrolytic solution are enclosed within the laminate film casing material.

Even when the above unit battery 100 is used, two second-end-side corner portions 116 in the second end portion 112 are chamfered to form chamfered portions 119 at both corner portions. Therefore, it is possible to achieve similar advantageous effects to those in the above-described case.

More specifically, even in the following battery pack, it is possible to achieve similar advantageous effects to those in the above-described case: a battery pack in which a plurality of unit batteries 100 is connected in series, with the unit batteries 100 including a positive-electrode pulled-out tab 120, a negative-electrode pulled-out tab 130, and a laminate casing member in which a first end portion 111, from which the positive-electrode pulled-out tab 120 and the negative-electrode pulled-out tab 130 are pulled out, a second end portion 112, which faces the first end portion 111 and on which no fusion bonding takes place, a first fusion-bonding portion 117, which has a first fusion-welding length in a direction in which a tab is pulled out at the first end portion 111, and chamfered portions 119, which are positioned at both second-end-side corner portions 116 of the second end portion 112, are provided. That is, according to the above configuration, even if vibrations are applied to the battery pack 800, the second-end-side corner portions 116, on which the chamfered portions 119 are formed, do not affect an adjacent unit battery 100. Therefore, the leakage of electrolytic solution and other troubles do not occur, making it possible to provide a highly reliable battery pack 800.

INDUSTRIAL APPLICABILITY

The present invention relates to a secondary battery pack such as lithium-ion battery that has been increasingly used in the field of power storage devices of mobile objects and other fields in recent years. Such a battery pack is made by connecting a plurality of unit batteries in series. The problem is that so far connection work is inefficient, and is low in productivity. According to the present invention, the battery pack of the present invention is made in such a way that pulled-out tabs of different polarities of a plurality of unit batteries are connected together on a board. Therefore, in producing the battery pack, work efficiency is high, resulting in an improvement in productivity. As a result, it is possible to achieve mass production and provide inexpensive secondary battery packs, and industrial applicability is very high.

EXPLANATIONS OF REFERENCE SYMBOLS

100 . . . unit battery
105 . . . electrode laminated area
110 . . . battery main unit
111 . . . first end portion
112 . . . second end portion
113 . . . side end portion
115 . . . first-end-side corner portion
116 . . . second-end-side corner portion
117 . . . first fusion-bonding portion
118 . . . second fusion-bonding portion
119 . . . chamfered portion
120 . . . positive-electrode pulled-out tab
125 . . . adding tab member
127 . . . hole
130 . . . negative-electrode pulled-out tab
137 . . . hole
200 . . . holder member
203 . . . pulled-out tab guide rib
210 . . . first surface
211 . . . first row
212 . . . second row
213 . . . pulled-out tab guidance section
214 . . . pulled-out tab guidance concave section 215 . . . pulled-out tab insertion hole
220 . . . pulled-out tab guide projecting section
221 . . . top section
222 . . . tapered side
230 . . . humping section
250 . . . second surface
251 . . . bridging structure section
255 . . . nut housing section
256 . . . nut
257 . . . pulled-out tab connection bolt
260 . . . divider piece
263 . . . positioning projection section
270 . . . screw hole
271 . . . board fixing screw
300 . . . board
314 . . . pulled-out tab guidance notch section
315 . . . pulled-out tab extraction hole
316 . . . pulled-out tab/divider piece extraction hole
317 . . . divider piece extraction hole
320a, 320b, 320c . . . thin-film electrode section
321 . . . metallic positive electrode washer
322 . . . metallic negative electrode washer
325 . . . pulled-out tab connection screw hole
328 . . . positioning hole
329 . . . board fixing screw hole
331, 332 . . . terminal member
340 . . . connector
400 . . . battery protective member
410 . . . flat-plate section
420 . . . notch section
421 . . . first notch section
422 . . . second notch section
423 . . . third notch section
440 . . . protection-side plate section
460 . . . two-sided adhesive tape
500 . . . battery connecting structure
504 . . . fourth cushioning member
505 . . . fifth cushioning member
530 . . . thermistor
600 . . . first case body
601 . . . first housing section
602 . . . second housing section
603 . . . circuit housing section
611 . . . discharge terminal attachment concave section
612 . . . charge terminal attachment concave section
613 . . . discharge terminal
614 . . . charge terminal
621 . . . first cushioning member
622 . . . second cushioning member
660 . . . second case body
661 . . . first housing section
662 . . . second housing section
663 . . . third cushioning member
673 . . . circuit housing section
700 . . . protective circuit board
800 . . . battery pack

The invention claimed is:
1. A battery pack, comprising:
a plurality of unit batteries that include a positive-electrode pulled-out tab and a negative-electrode pulled-out tab; and
a board on which pulled-out tab connection sections are formed to connect the pulled-out tabs of different polarities of adjacent unit batteries,
wherein the positive-electrode and negative-electrode pulled-out tabs of the unit battery, which is disposed on one end portion of the board, are both bent in the same direction.
2. A battery pack, comprising:
a plurality of unit batteries that include a positive-electrode pulled-out tab and a negative-electrode pulled-out tab; and
a board on which pulled-out tab connection sections are formed to connect the pulled-out tabs of different polarities of adjacent unit batteries,
wherein the positive-electrode and negative-electrode pulled-out tabs of the unit battery, which is disposed on one end portion of the board, are both bent in the same direction, and the positive-electrode and negative-electrode pulled-out tabs of the unit battery, which is disposed on another end portion of the board, are both bent in the same direction.
3. A battery pack, comprising:
a plurality of unit batteries that include a positive-electrode pulled-out tab and a negative-electrode pulled-out tab; and
a board on which pulled-out tab connection sections are formed to connect the pulled-out tabs of different polarities of adjacent unit batteries,
wherein the positive-electrode and negative-electrode pulled-out tabs of the unit battery, whose pulled-out tabs are connected by the pulled-out tab connection section, are bent in opposite directions.
4. A battery pack, comprising:
a plurality of unit batteries that include a positive-electrode pulled-out tab and a negative-electrode pulled-out tab; and
a board on which pulled-out tab connection sections are formed to connect the pulled-out tabs of different polarities of adjacent unit batteries,
wherein a divider piece is provided between the pulled-out tab connection sections, and the height of the divider piece from the board is higher than the height of a bolt used to connect pulled-out tabs in the pulled-out tab connection section.
5. A battery pack, comprising:
a plurality of unit batteries that include a positive-electrode pulled-out tab and a negative-electrode pulled-out tab;
a board on which pulled-out tab connection sections are formed to connect the pulled-out tabs of different polarities of adjacent unit batteries; and
a holder member that is fixed to the board and includes holes into which the positive-electrode and negative-electrode pulled-out tabs of a plurality of the unit batteries are inserted.
6. The battery pack according to claim 5, wherein
guide projecting sections are provided on the holder member in such a way that the holes are sandwiched therebetween.
7. The battery pack according to claim 6, wherein
tapered sides are provided on the guide projecting sections.
8. The battery pack according to claim 5, wherein:
the pulled-out tabs of different polarities of adjacent unit batteries are connected in the pulled-out tab connection section with connection members; and
a plurality of the holes are provided on the holder member, and bridging structure sections are provided between a plurality of the holes.
9. The battery pack according to claim 8, wherein
the connection members are bolts and nuts.

10. The battery pack according to claim 9, wherein nut housing sections are provided in the bridging structure sections to house the nuts.

11. The battery pack according to claim 8, wherein a divider piece, which is disposed between the pulled-out tab connection sections, is provided in the bridging structure section.

12. The battery pack according to claim 8, wherein a positioning projecting section is provided in the bridging structure section and used to position the board and the holder member.

13. The battery pack according to claim 8, wherein a screw hole, into which a fixing screw for fixing the board to the holder member is screwed, is provided in the bridging structure section.

* * * * *